United States Patent [19]

Bertolasi

[11] 3,912,340
[45] Oct. 14, 1975

[54] VEHICLE BRAKE CONTROL SYSTEM
[75] Inventor: Robert B. Bertolasi, Rockford, Ill.
[73] Assignee: Kelsey-Hayes Company, Romulus, Mich.
[22] Filed: Jan. 28, 1974
[21] Appl. No.: 436,938

Related U.S. Application Data
[63] Continuation of Ser. No. 218,362, Jan. 17, 1972, abandoned.

[52] U.S. Cl. ............................ 303/21 BE; 303/20
[51] Int. Cl.² ................................... B60T 8/02
[58] Field of Search ............ 188/181 C; 303/20, 21; 317/5; 324/160–161; 340/263

[56] References Cited
UNITED STATES PATENTS
| | | | |
|---|---|---|---|
| 3,525,553 | 8/1970 | Carp et al. | 303/21 P |
| 3,584,921 | 6/1971 | Crawford | 303/21 BE |
| 3,610,703 | 10/1971 | Slavin et al. | 303/21 P |
| 3,635,530 | 1/1972 | Packer et al. | 303/21 P |
| 3,647,267 | 3/1972 | Scharlack | 303/21 P |
| 3,710,186 | 1/1973 | Sharp | 317/5 |

Primary Examiner—Trygve M. Blix
Assistant Examiner—Douglas C. Butler
Attorney, Agent, or Firm—Harness, Dickey & Pierce

[57] ABSTRACT

A brake control system for the brake system of a wheeled vehicle to prevent a locked wheel (skid) condition and in which system the brake pressure is periodically released and reapplied with the time of release and reapplication being in response to determinable wheel velocity conditions with these conditions being determined as a function of a predetermined pre-programmed vehicle control curve or ramp.

66 Claims, 15 Drawing Figures

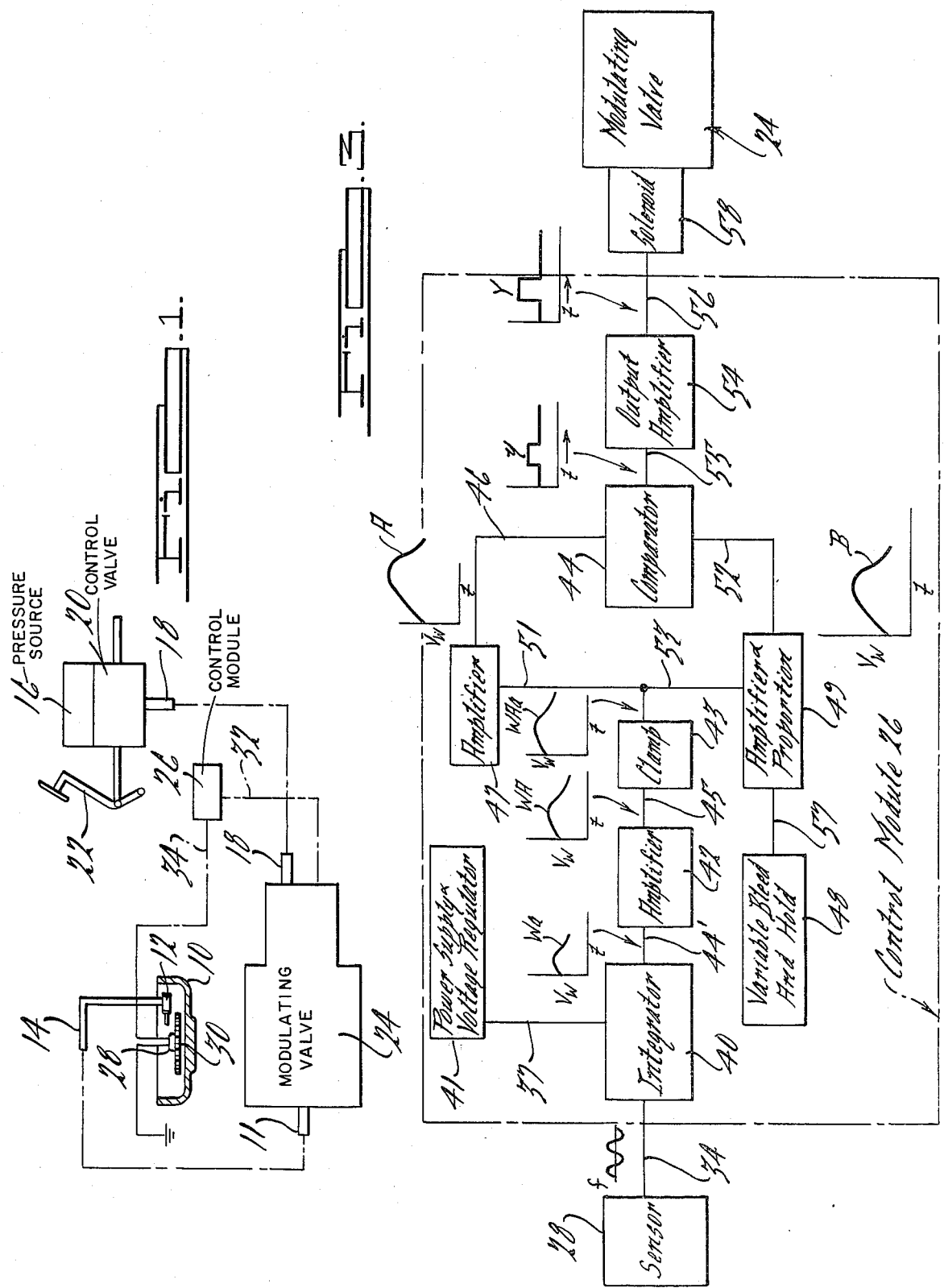

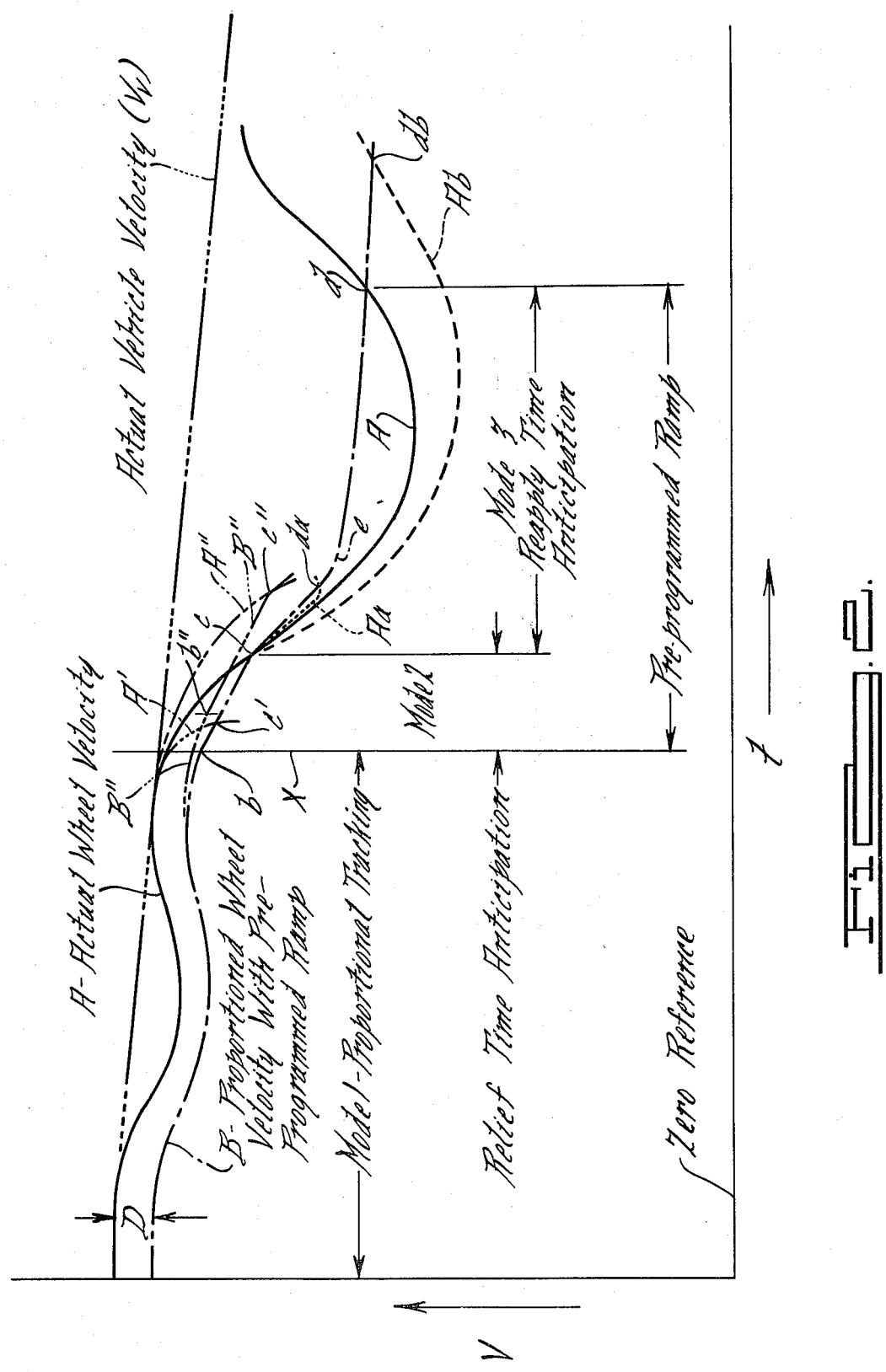

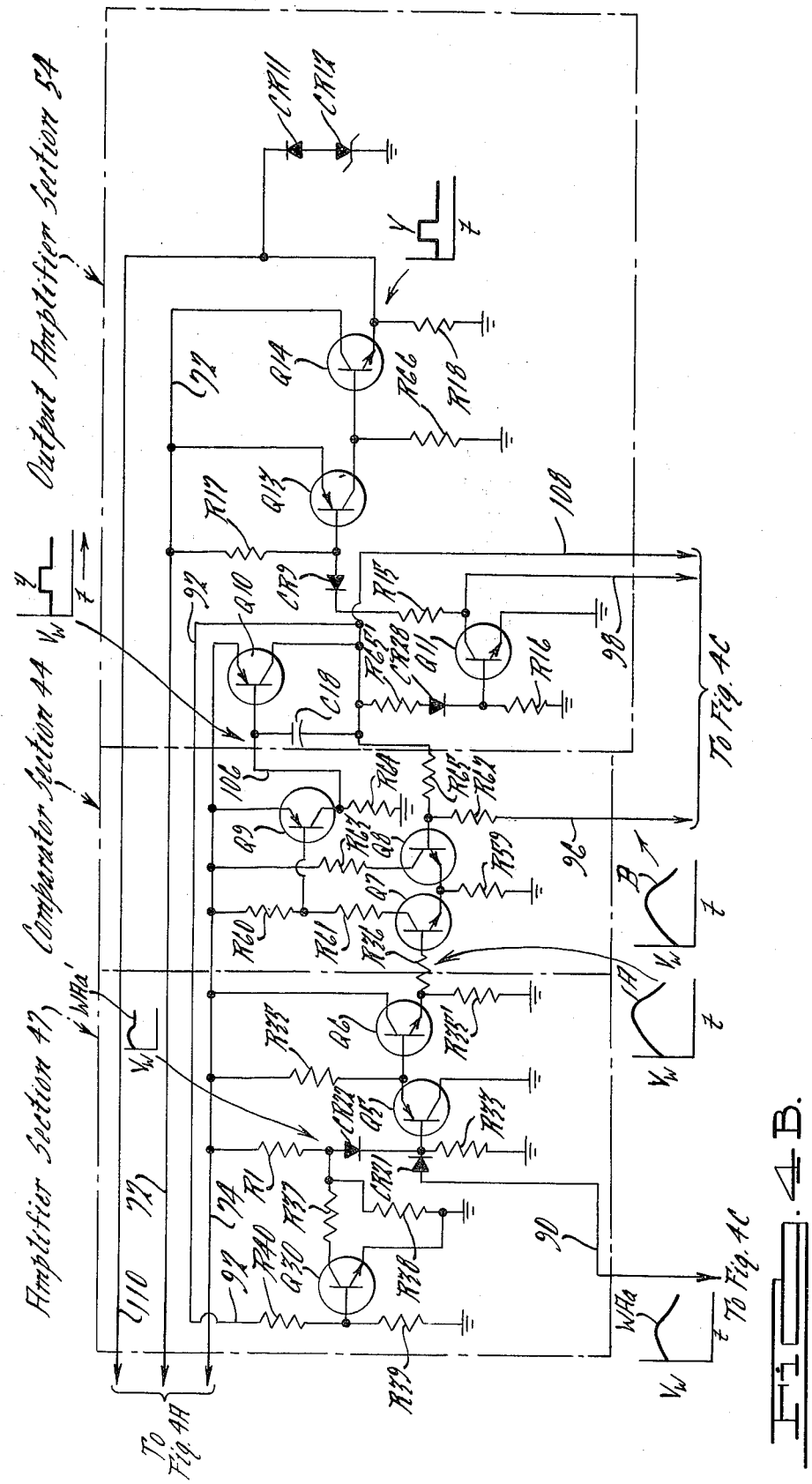

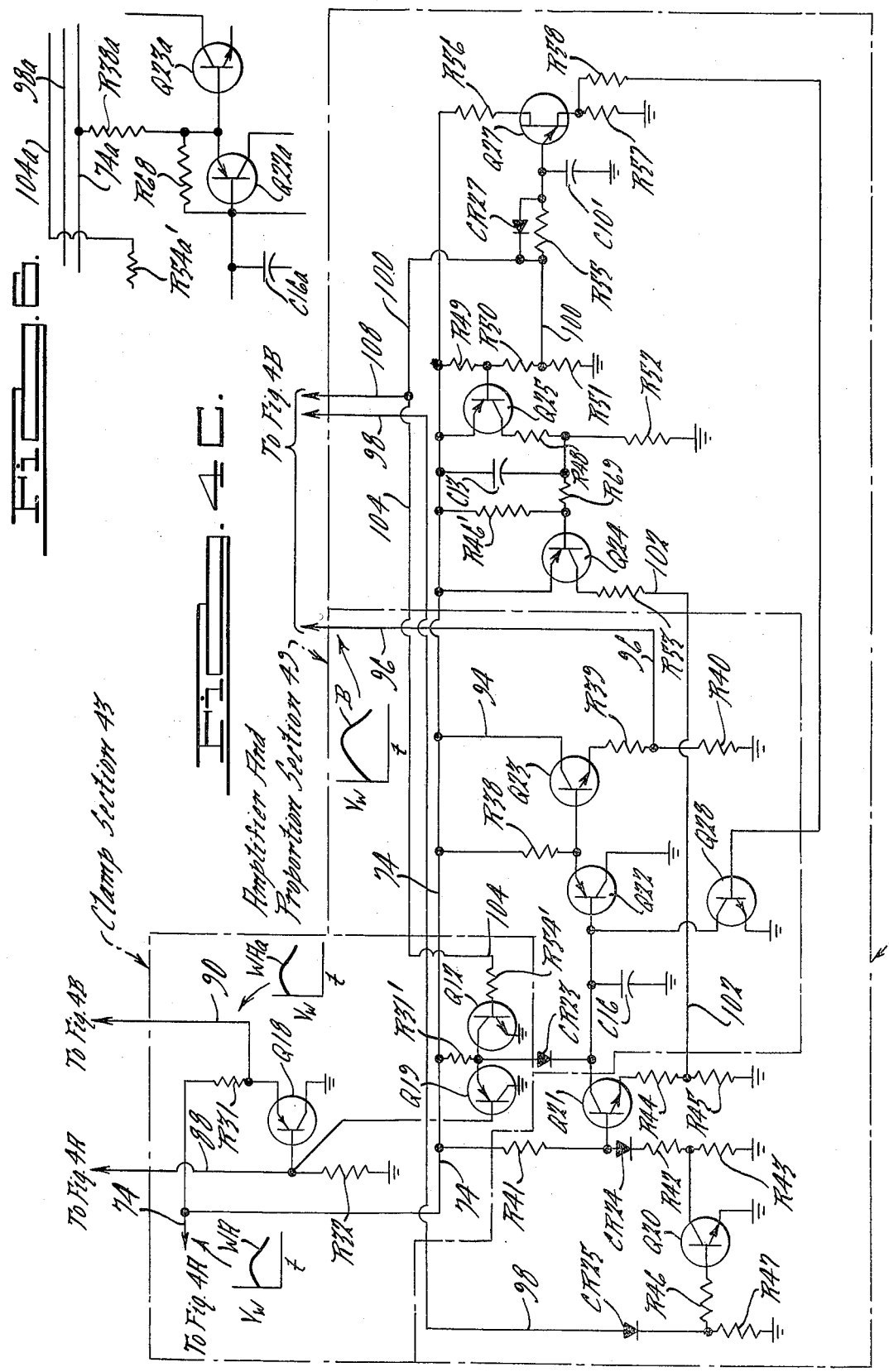

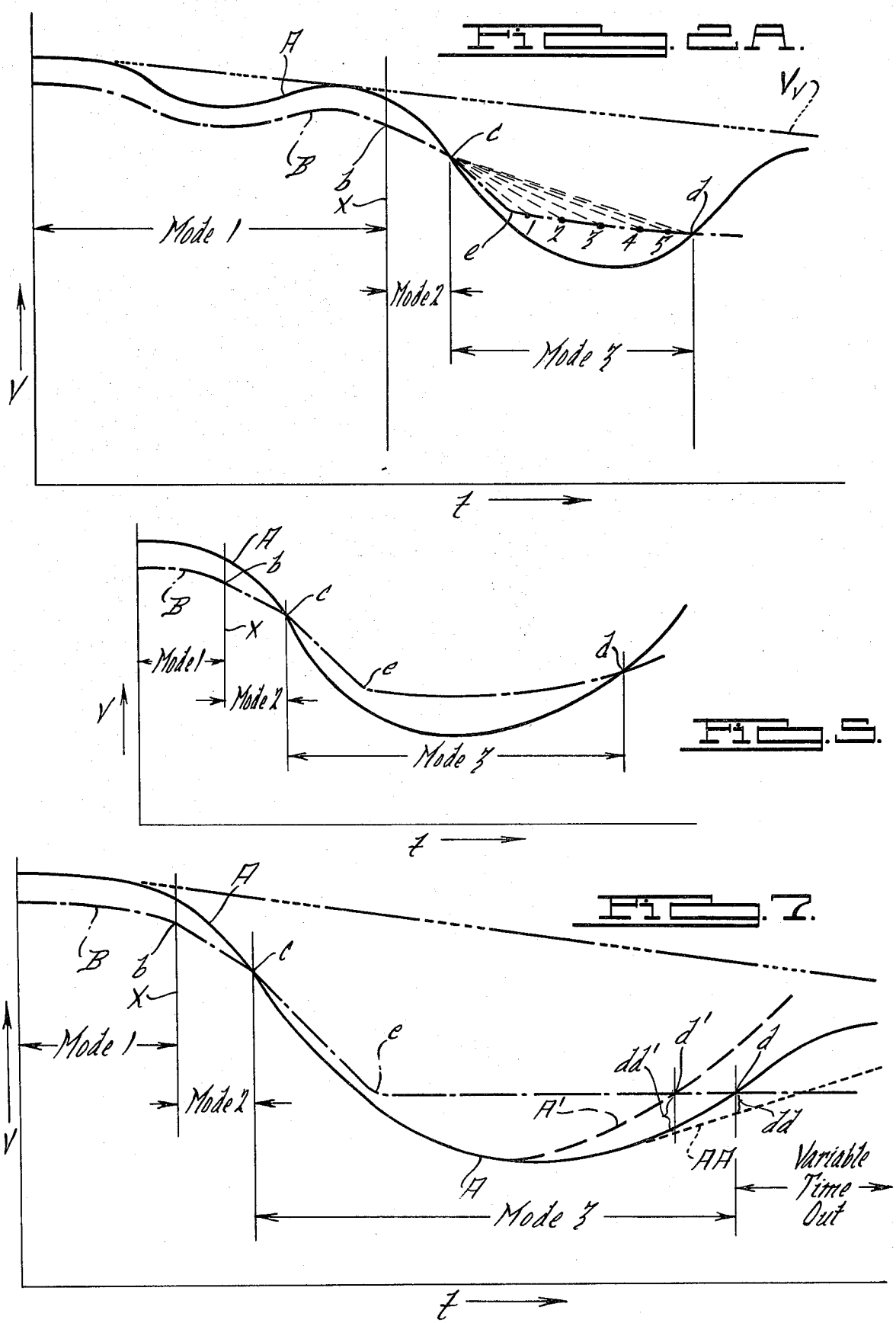

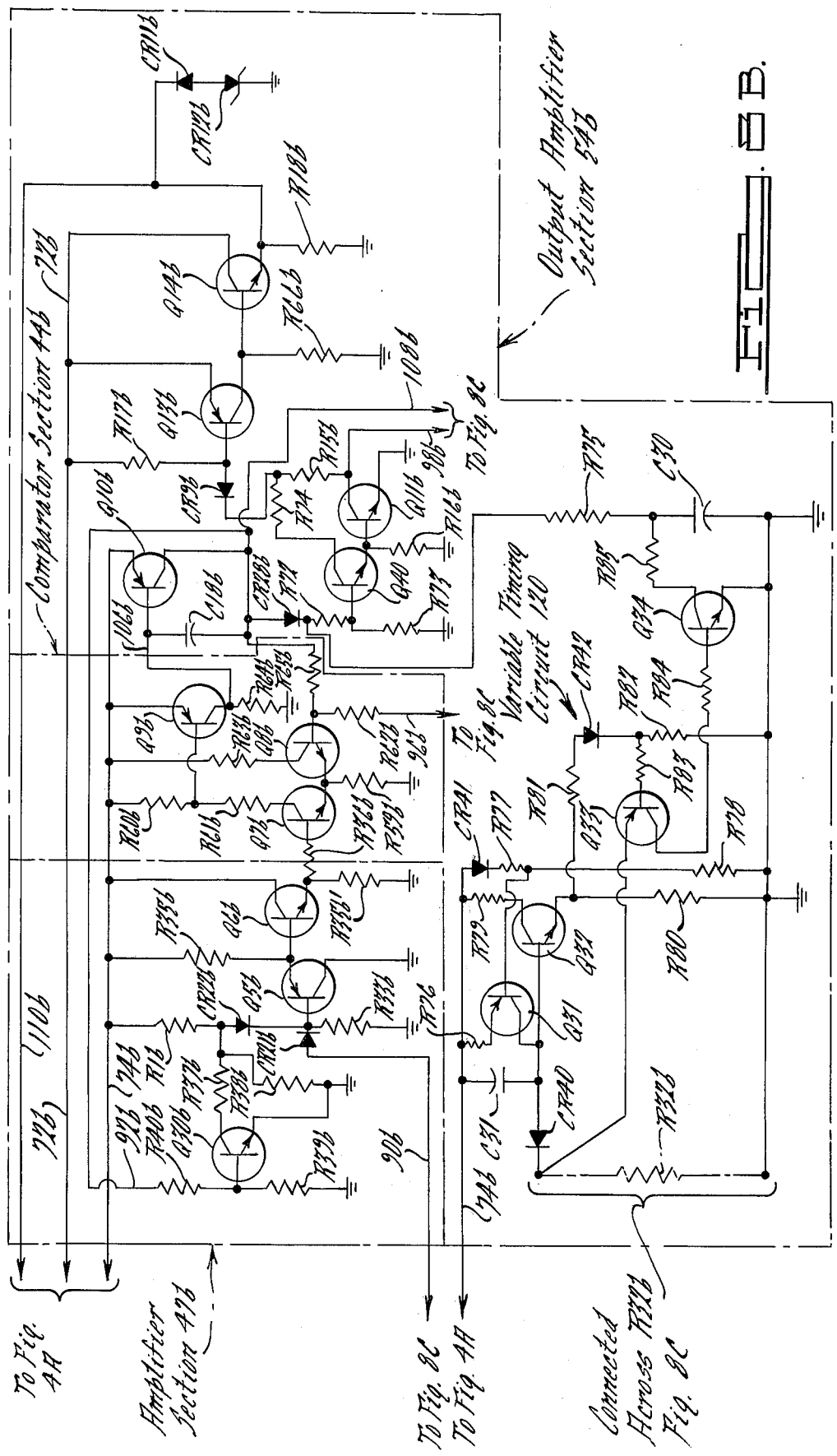

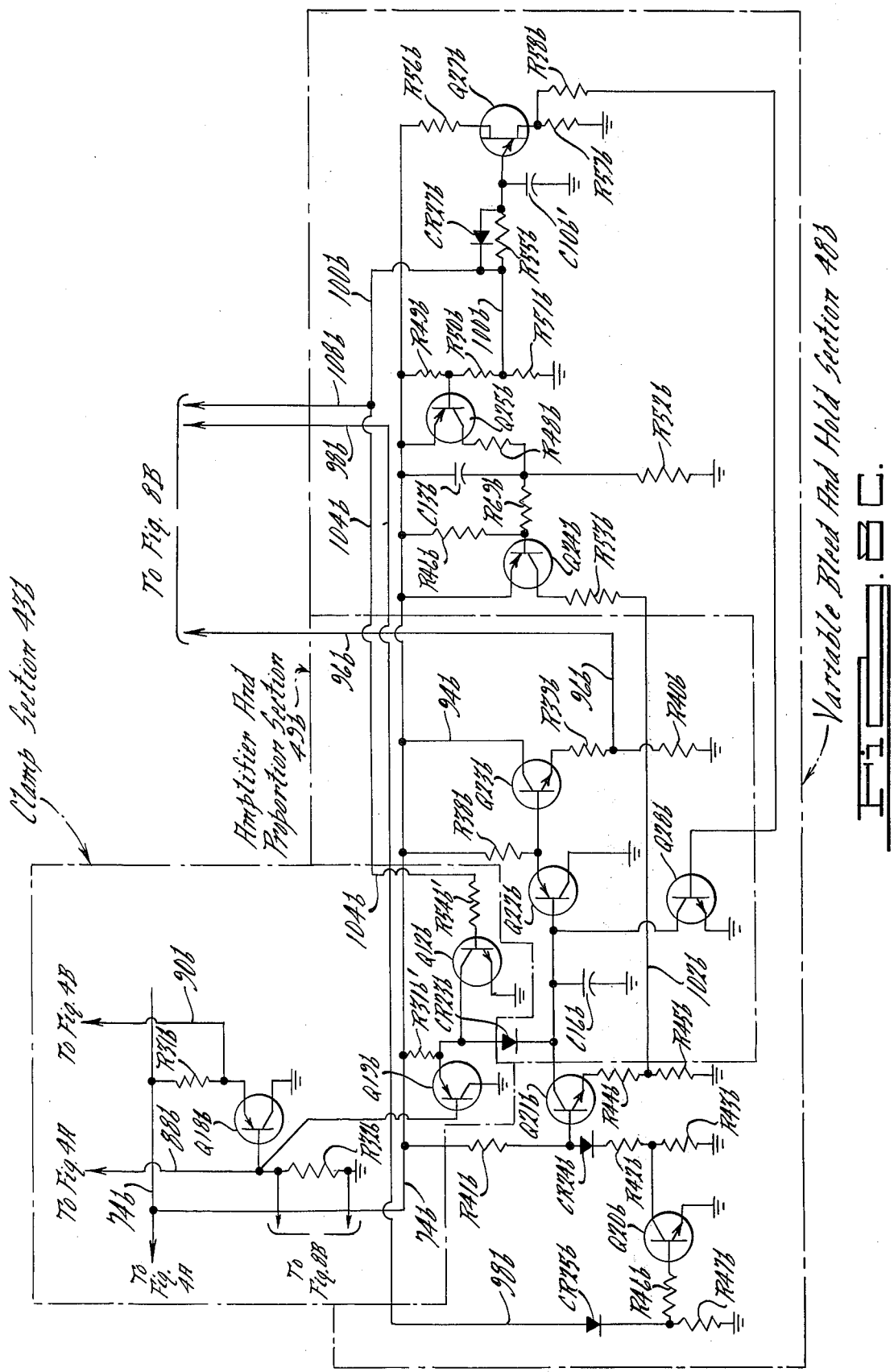

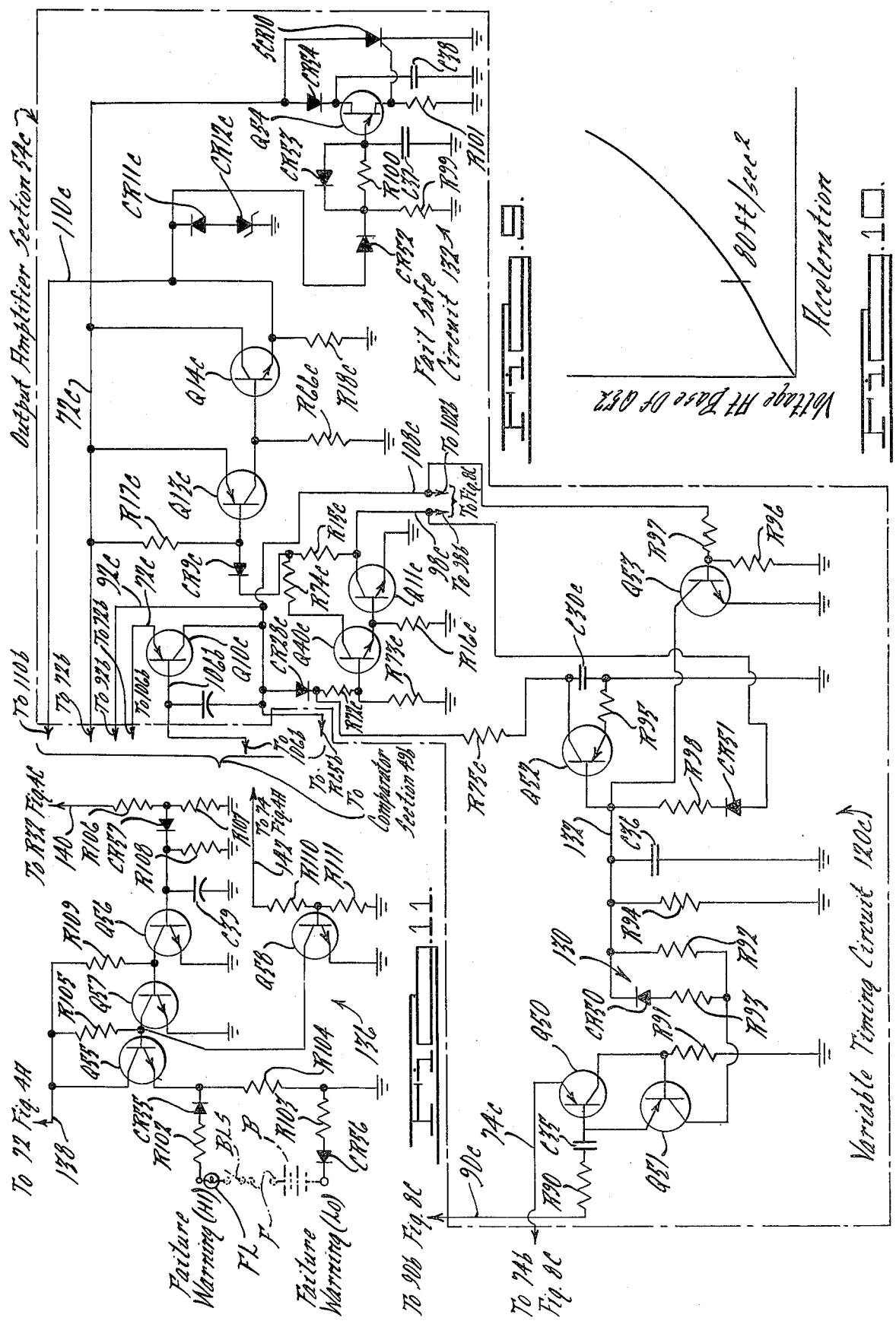

VEHICLE BRAKE CONTROL SYSTEM

This is a continuation of application Ser. No. 218,362, filed Jan. 17, 1972, now abandoned.

SUMMARY — BACKGROUND OF THE INVENTION

The present invention relates to a brake control system for the brake system of a wheeled vehicle in which the brake pressure is periodically released and reapplied with the occurrence of release and reapplication being predetermined to maintain the wheels in a desired velocity, non skid condition during a brake stop under excessive brake pressure.

During a brake stop it is desirable to avoid a locked wheel condition and also to avoid a condition in which the wheels are permitted to run at synchronous (vehicle) speed. With pulsating types of slip or skid control systems in which the brake pressure is periodically released and reapplied in order to avoid prolonged locked wheel or synchronous wheel conditions, the time of brake release and time of brake reapplication should be carefully selected such as to maintain the wheel in a desired slip range. To do this the inherent time delays of the system e.g. electrical, mechanical, pneumatic, hydraulic etc., must be properly compensated. In the present system the time of brake release is varied to compensate for variations in mu between tire and road and in vehicle loading. The time of brake reapplication is also varied to compensate for such mu and vehicle loading variations. In both cases the system time delays are compensated.

In the present system a vehicle control curve or ramp is generated which is based upon known performance characteristics of a vehicle and its associated braking system: the shape of the control curve reflects performance variations resulting from variations in mu and loading and compensates for known system time delays; skid control of the wheel is provided by controlling brake pressure in response to deviation in measured wheel speed as compared to the generated vehicle control ramp. Since skid control is provided here by a comparison of measured wheel speed to a programmed vehicle control, the system does not operate as a conventional slip system; note that actual or true slip is the difference between vehicle linear velocity (Vv) and wheel linear velocity (Wv). An actual or direct measure of vehicle velocity (Vv), however, requires costly additional components. In the present system actual vehicle velocity (Vv) is not used and need not be measured and control is achieved as a function of a simulated vehicle control ramp or curve. For skid control systems operative in response to slip the magnitude of slip at which brakes are released and reapplied should be varied in order to provide the proper application for the various conditions of mu, loading etc. Anticipation is provided in the present system (in a manner to be seen) by the use of the generated vehicle control curve or ramp.

In some slip or skid control systems in order to enhance the anticipation of the system and to provide better wheel control, the time of release or reapplication may be varied in subsequent control cycles in accordance with a time history of events occurring during the preceding cycle. In some situations surface mu conditions are not constant but vary erratically; thus this dependence upon information from prior cycles could lead to errors in pressure control which could be difficult to correct in subsequent cycles. This is avoided in the present system by providing a pre-programmed or predetermined vehicle control curve or ramp based upon the generally observed dynamic performance of vehicle brake systems; vehicle braking controlled by relating the wheel speed, and more particularly the time of occurrence of wheel speed as affected by wheel acceleration and deceleration, during braking to the control ramp whereby variations in mu and vehicle loading are automatically accounted for with the desired variations in anticipation being provided to compensate for known system time delays. This pre-programmed control curve is not based on or varied by historical information stored from dynamic events occurring in preceding cycles and hence this system is not subjected to error due to erratic wheel loading or cycle to cycle mu variations occurring during a brake stop. This can be of special importance for trucks where inter-axle and individual wheel braking variations can be substantial.

Therefore it is an object of the present invention to provide a novel skid control system which is operative on the time and rate relationships of wheel deceleration and acceleration to a vehicle control curve and in which the magnitude of anticipation at which brake pressure is released and reapplied is essentially varied to accommodate variations in mu, loading, etc.

It is another object of the present invention to provide a novel skid control system which is operative on the time and rate relationships of wheel deceleration and acceleration to a vehicle control curve and in which said novel vehicle control curve or ramp is generated and used in conjunction with measured wheel speed to provide desired anticipation to accommodate variations in mu, loading, etc.

In one form of the invention the vehicle control curve or ramp is fixed and does not vary in shape from one cycle to the next. Therefore, it is another object of the present invention to provide a novel skid control system in which a novel vehicle control curve or ramp (generally of the above described type) is generated and is a pre-programmed curve based on known vehicle and brake system characteristics and which curve is not varied from one skid control cycle to the next.

In another form of the invention the brake reapply time is varied in accordance with dynamic events which generally immediately precede brake reapplication; these variations, however, are not based on dynamic events from preceding control cycles but are based upon events occurring during that cycle to which the brake reapplication is related. Therefore it is another object to provide a novel skid control system in which a novel vehicle control curve or ramp (generally of the above described type) is generated and defines a pre-programmed curve based on known vehicle and brake system characteristics and in which the time of brake reapplication is varied by varying the response to the curve in accordance with dynamic events occurring during that cycle to which the brake reapplication is selected.

In one form of the invention the reapplication time is varied in accordance with the magnitude of wheel acceleration during spin-up; in one form this reapplication time is varied non-linearly; in one form of the invention this reapplication time variation occurs after the wheel speed intersects the pre-programmed vehicle control curve. Therefore it is an object of the present invention to provide a novel skid control system of the above described types and to provide a system of that type in which brake reapplication is varied with wheel acceleration.

It is another object of the present invention to provide a novel skid control system. In the present invention a control circuit has been provided utilizing circuit designs in which electronic time delays have been minimized. Such a design enhances the anticipatory characteristics of the total system. Therefore it is an object of the present invention to provide a skid control system using a control circuit design in which time delays have been minimized.

Other objects, features and advantages of the present invention will become apparent from the subsequent description and the appended claims, taken in conjunction with the accompanying drawings, in which:

FIG. 1 is a generally combined schematic and block diagram of a skid control system embodying features of the present invention;

FIG. 2 is a graphical representation of wheel linear velocity and a generated analogue of vehicle velocity versus time and generally illustrates the operation of the skid control system of the present invention;

FIG. 2A is a graphical representation similar to a portion of the graph of FIG. 2 and depicting the locus of points defining the curves of the analogue of vehicle velocity;

FIG. 3 is a block diagram of the control circuit for the system of FIG. 2;

FIGS. 4A, 4B and 4C show the circuit diagram of the control circuit for the system of FIG. 2;

FIG. 5 is a graphical representation similar to FIG. 2 for a modified system;

FIG. 6 is a partial circuit diagram for the modified system of FIG. 5;

FIG. 7 is a graphical representation similar to FIG. 2 for a different, modified system;

FIGS. 8B and 8C are circuit diagrams similar to FIGS. 4B and 4C, respectively, for the different modified system of FIG. 7;

FIG. 9 is a circuit diagram depicting a modification of the embodiment of FIGS. 8B and 8C;

FIG. 10 is a curve depicting the response of a portion of the circuit of FIG. 9; and FIG. 11 is a circuit diagram depicting a failure warning circuit for use with any of the embodiments described herein.

Figure 4A:
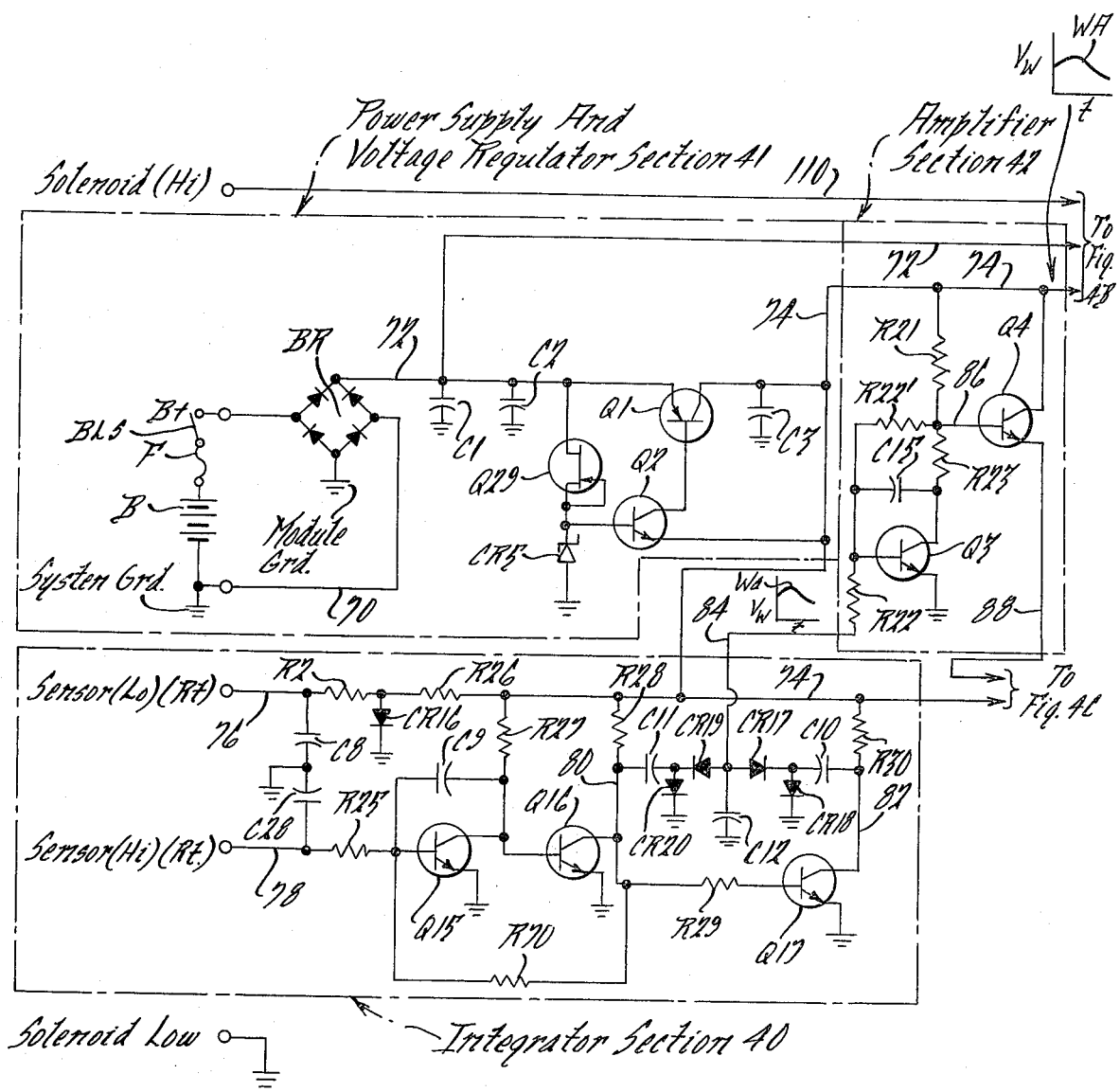

The skid control system of the present invention can be utilized and will be described specifically for use with trucks; however, it should be understood that the features of the invention could be utilized with other types of wheeled vehicles including aircraft. For simplicity the system will be described for use in conjunction only with one wheel of a multi-axle truck.

Looking now to FIG. 1, the schematic diagram generally shows the skid control system for use with one wheel which is equipped with a brake drum 10 and a wheel brake cylinder 12. A fluid line 14 is connected to the cylinder 12 and is pressurized by a source of fluid pressure 16 via a line 18. The control valve 20 can be of a conventional construction and actuated through a foot pedal 22. The fluid pressure from valve 20 can be modulated by means of a modulating valve 24 which is connected between the fluid lines 18 and 14, and hence the modulating valve 24 can control the fluid pressure to the wheel brake cylinders 12 and hence can control the operation of the brakes. The brakes associated with the brake drum 10 can be of a conventional construction and hence the details thereof have been omitted for the purposes of simplicity.

The modulating valve 24 in the present system is actuated in accordance with an electrical signal obtained from an electrical control module 26. The control module 26 receives information from a sensor 28 associated with the brake drum 10 by means of an exciter ring 30. The exciter ring 30 and sensor 28 can be of constructions known in the art to provide a pulsating or alternating electrical signal via conductor 34 to the module 26 which signal would be an indication of the rotational velocity of the associated wheel.

The control module 26 utilizes the velocity signal to provide an output signal when the wheel associated with the brake drum 10 has departed sufficiently from an acceptable wheel speed during braking as determined by comparison with the generated vehicle control curve. The output signal will be terminated when a different wheel departure condition is sensed, i.e. indicative that the wheel has returned to an acceptable wheel departure as determined by comparison with the generated vehicle control curve. The output or control signal will be transmitted by means of conductor 32 to the modulating valve 24. In the system of the present invention the control module 26 provides an "on" or "off" signal and modulation of the fluid pressure to the brake cylinders 12 will be provided by the modulating valve 24 by either relieving or reapplying brake fluid pressure.

The functioning of the system can be seen from the curves of FIG. 2 in conjunction with the block diagram of FIG. 3. The sensor 28 provides an output signal $f$ to module 26 via the output conductor 34; the signal $f$, which has a frequency the magnitude of which varies in accordance with the angular velocity of the wheel associated with drum 10, is operated on by an integrator circuit 40 which provides an output analogue signal ($Wa$) the amplitude of which varies in accordance with the frequency of the wheel speed signal $f$. The signal $Wa$ is then amplified by an amplifier 42 which receives signal $Wa$ via conductor 44'. The amplifier 42 provides an amplified signal $WA$ which also has an amplitude indicative of the wheel angular velocity and hence for a known tire size provides an indication of the linear velocity of the wheel. During periods of no-braking the signal $WA$ also is indicative of the actual vehicle velocity ($Vv$). The signal $WA$ is transmitted from amplifier 42 to a clamp reference circuit 43 via conductor 45; the clamp circuit 43 raises the reference potential to a selected magnitude above zero. The clamped output signal $WAa$ from clamp 43 is transmitted to a pair of amplifiers 47 and 49 via conductors 51 and 53, respectively. The amplified signal A from amplifier 47 is transmitted to one side of a voltage comparator circuit 44 via conductor 46. The output signal B of amplifier 49 is transmitted to the opposite side of voltage comparator circuit 44 via conductor 52. As will be seen, the signal B defines either a proportion of the signal A or the pre-programmed vehicle control ramp. To this end the amplifier 49 also provides the proportioning function such that the output signal B will normally be a preselected proportion of signal A. The amplifier 49 is also operated on a variable bleed and hold circuit 48. The circuit 48, connected to amplifier 49 via connection 57, under certain circumstances to be described, operates on amplifier 49 to generate the preprogrammed vehicle control ramp via a controlled, variable bleed rate. The resultant output from amplifier 49 is the control signal B which, as noted, is transmitted to the comparator circuit 44 where it is compared to signal A to determine the circuit output condition. Note that a power supply and voltage regulator circuit 41 provides the required output potential and regulated potential; this output potential is schematically shown as being transmitted to the associated circuitry via line 37.

The comparator circuit 44 functions such that when signal A has an amplitude which exceeds that of signal B there will be no resultant output signal but when signal B has an amplitude exceeding that of signal A an output signal $y$ will be generated. The signal $y$ will continue to be generated until signal A again exceeds signal B. The signal $y$ as transmitted via conductor 55 is amplified by amplifier 54 which provides output signal Y at conductor 56. The signal Y can be utilized to energize a solenoid 58, the actuation of which results in modulating valve 24 being actuated to relieve brake pressure. Upon termination of signal Y, i.e. signal A exceeds B, the solenoid 58 will be de-energized and modulating valve 24 will act to reapply brake pressure. Thus the relief and reapplication of brake pressure is a direct function of the amplitude of the model signal B when compared to the actual wheel speed signal A. As will be seen the control signal B is generated in such a manner as to compensate for variations in mu and wheel loading and also to account for the inherent time delays of the system whereby the wheel speed during the controlled braking in a skid control cycle will be maintained in a desired slip range between synchronous and locked wheel. The functioning of the amplifier and proportion circuit 49 is affected by the variable bleed and hold circuit 48 as can be seen from the curves of FIG. 2.

As shown in FIG. 2, the amplifier circuit 49, as affected by the variable bleed and hold circuit 48, provides the signal B with three modes of operation, i.e. Mode 1 — proportional tracking, Mode 2 — relief time anticipation, and Mode 3 — reapply time anticipation.

The circuit 49 provides Mode 1 operation as long as the vehicle is not braked excessively or, in other words, as long as the magnitude of the braking does not result in the occurrence of an incipient skid condition. In Mode 1 operation the signal B will follow or track signal A at a preselected proportion (relative to zero reference). This provides signal B at a variable offset D relative to signal A. Considering that signal A is representative of the actual magnitude of wheel linear velocity, and signal B is a percentage of the wheel linear velocity, then the offset D can be considered to be a quantity of slip, which quantity varies with the magnitude of wheel speed. Since skid control operation cannot be initiated until the amplitude of signal B exceeds that of signal A there will be no skid control function while circuit 49 is in Mode 1 operation.

In the event the wheel decelerates excessively at a magnitude indicative of an incipient skid condition then circuit 49 will commence Mode 2 operation indicated as point $b$ in FIG. 2. The amplitude X of deceleration selected for one system was 30 ft./sec$^2$. The amplitude X as determined for a system is that maximum amplitude of deceleration at which the wheel could, in the absence of skid control, normally go into a locked wheel condition under the highest, practical mu and most favorable, practical load conditions. In other words, at a deceleration rate slightly less than X, the wheel would not necessarily lock up at all conditions. Experience has shown, however, that if the brakes are always immediately relieved at the occurrence of a wheel deceleration of X that under high mu, high wheel load conditions the wheel would not have an opportunity to remain in the preferred slip range to maximize braking but would spin-up rapidly and could even run at synchronous speed before the brakes could be reapplied. Thus it would be desirable to permit the wheel, under this high mu, high load condition, to run down into a deeper slip condition. This same result could be accomplished by increasing the amplitude of wheel deceleration at which brakes are relieved to an amplitude greater than X. This, however, would provide difficulties for operation in low mu conditions in which the time delay, in initiating relief of brake pressure until the higher amplitude of deceleration is attained, could result in a locked wheel condition. This problem of providing the proper anticipation time to initiate relief of brake pressure is met by the Mode 2 operation.

Thus when the wheel decelerates at an amplitude of X (e.g. 30 ft./sec.$^2$) or greater the signal B no longer tracks the signal A at a fixed offset but rather decreases in amplitude at a fixed, desired rate, i.e. indicative of a selected deceleration rate. This fixed rate is preferred to be approximately equal to X (or around 30 ft./sec.$^2$). As previously noted brake pressure relief will be initiated when signal B exceeds signal A, or generally when the curve of signal A intersects the curve of signal B as at point $c$ in FIG. 2. Thus the signal offset of D as set in Mode 1 is an important factor in Mode 2 in determining the anticipation time for brake relief to occur. The magnitude of D is determined knowing the inherent time delays in the brake system as well as in the electronics of the module 26. For a low mu condition it is desirable to initiate relief rapidly, while for a high mu surface it is desirable to delay initiation of relief. In FIG. 2 the curves or signals A and B are shown for medium mu, medium wheel load conditions. For a low mu, low load condition wheel speed curve A' would intersect vehicle curve B at $c'$ to provide initiation of brake relief sooner, i.e. than point $c$ for the medium mu, medium load condition. For a high mu, high wheel load condition curve A'' will intersect curve B'' at point $c''$ in FIG. 2 whereby initiation of pressure relief will be later than the low or medium mu conditions depicted, i.e. point $c$. Thus initiation of the brake relief signal will occur sooner for low mu, low load conditions and will occur later for high mu, high load conditions. In this way the proper anticipation for initiation of brake relief will be provided for the various mu and load conditions. While the preferred deceleration rate for signal B in Mode 2 was selected at around 30 ft./sec.$^2$ the rate could be in a range of from 10–50 ft./sec.$^2$. However, the proportion of amplitude of signal B to A and hence offset D would be varied accordingly and the proportion would be decreased in amplitude (D increased) for values below 30 ft./sec.$^2$ and increased in amplitude (D decreased) for values above 30 ft./sec.$^2$; this would compensate for the fact that for low amplitudes of deceleration the curve of signal B will begin Mode 2 operation sooner than for higher amplitudes of deceleration. Note that since signal B is a proportion of signal A in Mode 1 the magnitude of offset D will vary with the wheel speed and hence with vehicle speed. This is desirable since at higher wheel and vehicle speeds a greater time delay can be tolerated before initiation of brake relief; this is due to the fact that at higher speeds the wheel is, or course, at a greater amplitude from locked wheel (zero wheel speed) than at lower wheel speeds. For a value of X in the range of around 25–35 ft./sec.$^2$, it is believed desirable to maintain signal B at around 94 percent to around 98 percent of signal A. The Mode 2 operation, then, provides the proper anticipation in order that the relief of pressure to the brakes be initiated with sufficient anticipation to prevent a locked wheel and, at the same time, with the degree of anticipation being varied to permit adequate wheel departure whereby braking will occur in a desired slip range. While Mode 2 operation controls the initiation of brake relief, Mode 3 operation controls the initiation of brake reapplication.

In Mode 3 operation again the inherent time delays both in the brake system and in the electronic circuitry are taken into consideration. In Mode 2 it was found that the generation of a ramp indicative of a generally uniform or constant deceleration rate was satisfactory. However, from observation it has been determined that in determining the time for brakes to be reapplied a constant or uniform deceleration ramp would not provide optimum results. This occurs since the vehicle does not decelerate at a constant rate under all variations of surface mu and vehicle loading. Therefore, ideally a different ramp would have to be generated for each condition variation; this is shown in FIG. 2A with the different ramps represented by curves $c$-1, $c$-2 . . . $c$-5. The present system operates as a dynamic control system with the generated ramps referred to for Modes 2 and 3 providing a locus of the control points necessary to achieve proper brake pressure relief and reapply anticipations. For Mode 3 this is done in effect by generating a curve which defines such locus of points (i.e. 1, 2, 3 . . . 5 of FIG. 2A) at which the different curves of signal A under different conditions again intersect the curve of signal B (such as at point $d$ in FIG. 2) for proper anticipation; the result is the curve $c$-$d$ of FIG. 2 (and of FIG. 2A). Curve $c$-$d$ is non-linear and represents a generally continuous, rapid change in deceleration rate in its initial portion from point $c$ to point $e$ and thereafter (point $e$ to point $d$) a continuous but gradual change in deceleration rate. The desired shape of the curve $c$-$d$ can be determined through observation of a vehicle brake system under the various mu and load conditions such that the intersection point $d$, i.e. brake reapplication signal initiated, will occur at a desired time. If the initiation of braking occurs too soon, the wheel will be braked at too great a wheel departure or magnitude of slip and there will be a likelihood of reaching a locked wheel condition after several cycles. If the initiation of braking occurs too late, the wheel will be braked at too small a wheel departure or magnitude of slip and there will be a likelihood of the wheel running synchronous (at vehicle speed). For high mu, high load conditions it is desirable to apply the brakes early to avoid synchronous running. For low mu, light load conditions it is desirable to apply the brakes substantially later to avoid locked wheel possibilities. This is shown in FIG. 2 where curve Aa indicates a high mu, high load condition and intersects curve B at $da$ and curve Ab indicates a low mu, low load condition and intersects curve B at $db$. The points $da$, $d$ and $db$ provide desired points of initiation of the signal to reapply brakes to provide proper anticipation for the variations in mu and loading noted. It can be seen that while each of the individual points ($da$, $d$, $db$) could be connected to point $c$ by a straight line representing a fixed deceleration rate all of these points cannot be connected by a straight line starting from point $c$; thus no single, constant deceleration rate will accommodate the variations in load, mu etc., and hence the variable bleed representative deceleration ramp of curve $c$-$d$ is generated. This curve ($c$-$d$) represents the locus of desired individual points at which the signal to reapply the brakes will be initiated. The circuit diagram for the system of FIGS. 1–3 is shown in FIGS. 4A, B and C: In the prior description of the block diagram of FIG. 3, the lines indicated as electrical conductors are for explanation only; the actual conductors and circuit arrangement being shown in FIGS. 4A, B and C.

Power Supply and Voltage Regulator Section 41

A battery B has its positive side connected to one side of the input of a full wave bridge BR via a protective fuse F and brake switch BLS and has its negative side connected to the opposite side of the input of bridge BR via a system ground indicated by conductor 70 (see FIG. 4A). The brake switch BLS is normally opened whereby the module 26 is normally deactuated and will be actuated when the brakes are applied and switch BLS is closed in response thereto. The output of the bridge BR is taken from conductor 72 at one side and module ground, which is isolated from system ground of battery B at the opposite side. Henceforth, unless otherwise indicated any reference to ground will be to module ground. Output conductor 72 is connected to ground via a pair of bypass or filter capacitors C1 and C2. The output potential at conductor 72 is connected to output line 74 via the emitter-collector circuit of p-n-p transistor Q1 which has its base connected to the line 74 via the emitter collector circuit of n-p-n transistor Q2. The collector of Q1 is connected to ground via a by-pass capacitor C3. A field effect transistor Q29 has base two connected to conductor 72 and its base one connected to ground via a zener diode CR5. The base of Q2 is connected to the base one of Q29 which has its emitter connected at the same connection. Q2 and Q29 act in response to the magnitude of the voltage at conductor 72 to control the conduction of Q1 whereby the output potential at line 74 will be regulated.

Integrator Section 40

The integrator section 40 (see FIG. 4A) includes n-p-n transistors Q15 and Q16 which are connected together to amplify the input signal. Each transistor Q15 and Q16 is biased to be driven into saturation such as to provide a square wave output signal. An n-p-n transistor Q17 is connected to the transistor Q16 and acts as an inverter whereby one output signal can be obtained from Q16 and one from Q17 alternately such as to provide for frequency doubling.

Thus the sensor 28 is connected to the section 40 via conductors 76 and 78, with conductor 78 being connected to the base of the transistor Q15 via dropping resistor R25; Q15 has its emitter connected directly to ground. The collector of Q15 is connected to B plus output line 74 via a dropping resistor R27, with resistor R27 being connected to conductor 76 via dropping resistors R2 and R26. A biasing diode CR16 biases the sensor signal at a desired level for subsequent amplification and is connected from between R2 and R26 to ground. A feed back capacitor C9 is connected between the collector and base of the transistor Q15 and a feedback resistor R70 is connected from the collector of Q16 to the base of Q15. A pair of capacitors C8 and C28 are connected between conductors 76 and 78 and to ground at their juncture to provide for removal of noise from the input signal; the amplified signal from the collector of transistor Q15 is transmitted directly to the base of transistor Q16 which has its collector connected to B plus output line 74 via load resistor R28 and has its emitter connected directly to ground. The result of the amplification of the input signal by transistors Q15 and Q16 is a square wave output appearing at the collector of Q16, which is transmitted via output conductor 80. As noted, the transistor Q17 is used as a phase inverter and hence its base is connected to the output at collector of transistor Q16 via a biasing resistor R29. Transistor Q17 has its collector connected to B plus line 74 via a load resistor R30 and has its emitter connected to ground. The inverted square wave from the collector of transistor Q17 is transmitted to the output by conductor 82. Hence output pulses will be provided at conductors 80 and 82 which will be square waves of substantially constant amplitude and of a frequency which varies in accordance with the frequency of the input signal from the sensor 28.

The square wave output at the output conductor 82 is differentiated via a capacitor C10 through a diode CR18 which has its cathode connected to ground. A second diode CR17 has its cathode connected to the anode of CR18 and has its anode connected to an integrating capacitor C12 which is in turn connected to ground. The differential signal is integrated and the integrated signal appears as a direct potential across the capacitor C12. In a similar manner, the output square wave at conductor 80 is differentiated and integrated with the integrated signal appearing across C12. Thus the conductor 80 is connected to differentiating capacitor C11 which in turn is connected to diode CR20 which has its cathode connected to ground. Diode CR19 has its cathode connected to the anode of diode CR20 and has its cathode connected to the capacitor C12. The capacitor C12 is connected to the amplifier section 42 via an output conductor 84.

Amplifier Section 42

The amplifier section (see FIG. 4A) 42 includes a Miller integrator amplifier which provides at its output a potential varying in magnitude in accordance with variations in potential at the integrating capacitor C12. The amplifier section 42 includes an n-p-n transistor Q3 which has its base connected to conductor 84 via biasing resistor R22. Transistor Q3 has its emitter connected to ground and its collector connected to the B plus line 74 via a voltage divider network comprising serially connected resistors R21 and 23. A capacitor C15 is connected between the base and collector of transistor Q3. A base biasing resistor R22' is connected from the juncture of resistors R21 and R23 to the base of transistor Q3. Transistor Q3 is biased to be normally on and will have an output signal appearing at conductor 86 located at the juncture of resistors R21 and R23. The output signal will vary in amplitude generally in accordance with the magnitude of the signal at capacitor C12. Note that transistor Q3 is normally saturated and hence the output potential at conductor 86 will be a positive, minimum potential; however, as the charging capacitor C12 becomes more negative (with increasing frequency), Q3 conducts less and the potential at conductor 86 will increase. Capacitor C15 and its associated circuitry provide an additional integrating function whereby the relatively smooth output potential is provided at the output conductor 86. The output signal at conductor 86 is transmitted to the base of n-p-n transistor Q4 which has its collector connected to output line 74 and has the output signal at its emitter connected to the clamp section 43 via conductor 88. The transistor Q4 is connected as an emitter follower which provides isolation and prevents loading of transistor Q3.

Clamp Section 43

The purpose of the clamp section 43 (see FIG. 4C) is to raise the reference for the velocity signal at conductor 88 to a selected magnitude above zero to compensate for anticipated voltage drops through succeeding circuitry. The clamp section 43 comprises a pair of p-n-p transistors Q18 and Q19 each of which functions as an emitter follower. The bases of Q18 and Q19 are connected together and are connected to ground via a dropping resistor R32, and both have their collectors connected to ground. Q18 has its emitter connected to B plus line 74 via a bias resistor R31 while Q19 has its emitter connected to line 74 via resistor R31'. An n-p-n transistor Q12 is connected to the emitter collector circuit of Q19 and serves a purpose to be described. The output of transistor Q18 is coupled to the voltage comparator circuit 44 after amplification by amplifier section 47 while the output of transistor Q19 is coupled to the voltage comparator circuit 44 after amplification and modification via ammlifier and proportion section 49.

Amplifier Section 47

The amplifier section 47 (see FIG. 4B) includes p-n-p transistor Q5 which has its collector grounded and its emitter connected to B plus line 74 via dropping resistor R35. The base of Q5 is coupled to the emitter of Q18 of the Clamp Section 43 via a conductor 90 and diode CR21. The base of Q5 is also connected to ground via biasing resistor R33 and is connected to B plus line 74 via diode CR22 and resistor R1. Diodes CR21 and CR22 perform blocking functions between the output stage of Q18 and the input stage of Q5 such that a minimum velocity or speed "minimum" signal is imposed on the wheel velocity signal. The wheel velocity signal (WAa of FIG. 3) appearing at the output conductor 90 is amplified and this amplified output appears at the emitter of Q5 which is connected to the base of an n-p-n transistor Q6. Transistor Q6 has its collector connected to B plus line 74 and has its emitter connected to ground via output resistor R35'. The amplified wheel velocity output signal (signal A of FIGS. 2 and 3) at the emitter of Q6 is coupled to the Comparator Section 44 via resistor R36. The Comparator Section 44, as will be seen, controls the actuation of the modulating valve 24 in response to the amplified wheel velocity signal (signal A) from Q6 when compared to a modified or vehicle control signal (signal B) from the Amplifier and Proportion Section 49. As previously noted the system of the present invention is not a slip system but the Comparator Section 44 is responsive to determinable variations in wheel departure related to time as when the wheel speed signal from Amplifier Section 47 falls a determinable differential below the control signal from the Amplifier and Proportion Section 49. It is presently considered unnecessary to exercise the skid control system if the vehicle velocity is below 5 m.p.h. and not actively engaged in a control cycle. To prevent the occurrence of a skid control signal under these conditions the amplified signal of Amplifier Section 47 is clipped such that, prior to skid control actuation, the amplified wheel speed signal will not fall below a magnitude indicative of a preselected minimum magnitude of wheel speed (see signal WAa'). In a preferred form this magnitude is selected as 5 miles per hour. Once skid control operation has been initiated, however, this clipping action is terminated for the remainder of that cycle. The above action is performed in Amplifier Section 47 by n-p-n transistor Q30 and its associated circuitry. Q30 has its emitter connected to ground and has its collector connected to the base circuit of Q5 via resistor R37 which is connected to the juncture of diode CR22 and resistor R1. That juncture is also connected to ground via resistor R38. Resistors R1 and R38 define a voltage divider network for the base circuit of Q5 which establishes a bias preventing Q5 from providing an output signal below a selected minimum to provide the output signal at Q6 which is the equivalent of 5 m.p.h. Transistor Q30 is normally off and hence normally will not affect the divider network of R1 and R38. Q30, however, is connected to conduct in response to initiation of a skid control signal and when conductive will shunt the resistor R38 such that the bias maintaining the 5 m.p.h/ reference voltage will be essentially removed whereby during a skid control cycle the amplified wheel speed signal can provide voltage indicative of wheel speeds below 5 m.p.h. and approximately to zero m.p.h. This is accomplished by connecting the base of Q30 to ground via resistor R39 and to Output Amplifier Section 54 via resistor R40 and conductor 92. Thus when a skid control signal is generated, Q30 will be rendered conductive to remove the 5 m.p.h. bias at Q5; upon termination of the skid control signal Q30 will cease to conduct and the 5 m.p.h. bias will again be provided at Q5.

As noted the system functions as a dynamic control system with the wheel departure-time relationship being determined by a comparison in the Comparator Section 44 of the amplified wheel speed signal (signal A) from Amplifier Section 47 relative to the vehicle control signal (signal B) from the Amplifier and Proportion Section 49. This latter section is described below.

Amplifier and Proportion Section 49

Looking now to FIG. 4C, a wheel speed signal (corresponding to signal WAa of FIG. 3), similar to that at conductor 90 of emitter of Q18, also appears at the emitter of Q19. This signal (WAa) is coupled to the section 49 via a blocking diode CR23 which is connected to ground via a capacitor C16. As will be seen, normally the magnitude of the charge on capacitor C16 will be a diode drop less than the wheel speed signal (WAa) from Q19 of the Clamp Section 43. The charge signal on C16 is connected to amplifier stages defined by transistors Q22 and Q23, which are similar to the amplifier stages defined by transistors Q5 and Q6 in Amplifier Section 47. Thus p-n-p transistor Q22 has its base connected to C16 and has its collector connected to ground. The emitter of Q22 is connected to B plus line 74 via resistor R38. The output at the emitter of Q22 is connected to the base of n-p-n transistor Q23, which has its collector connected to B plus line 74 via conductor 94; the emitter of Q23 is connected to ground via a voltage dividing network defined by a pair of resistors R39 and R40. The resistances of R39 and R40 are selected relative to each other and to the associated circuitry such as to provide an output signal on conductor 96 at the juncture of R39 and R40 which is selected, fixed percentage of the output signal at the emitter of Q23; this provides the fixed percentage (i.e. 94–98 percent) of the output signal at the emitter of Q6 from the Amplifier Section for Mode 1 operation. Thus for Mode 1 operation the velocity signal (B) at conductor 96 will track or follow that wheel velocity signal (A) at the emitter of Q6 at the preselected percentage. As long as there is no braking at which the deceleration exceeds the selected magnitude X (i.e. 10–50 ft./sec.$^2$) the system will remain in Mode 1 condition and will continue to track at the selected percentage. Upon occurrence of a deceleration in excess of X the section 49 will function in its Mode 2 condition as controlled by the Variable Bleed and Hold Section 48 which is described next.

Variable Bleed and Hold Section 48

Still looking to FIG. 4C, the functioning of the system in Mode 2 and 3 is generally controlled by the operation of Section 48 on the magnitude of the charge on C16. The section 48 includes a constant current bleed circuit which comprises transistors Q20 and Q21 both of which are normally conductive throughout Mode 1 and Mode 2 operation. Q21 is an n-p-n transistor having its base biased by a voltage divider network including a resistor R41 connecting the base to B plus line 74 and resistors R42 and R43 connecting the base to ground via a diode CR24. Q21 has its emitter connected to ground via serially connected resistors R44 and R45 and has its collector connected to the juncture of capacitor C16 and diode CR23. The circuit of transistor Q21 defines a constant current amplifier with the rate of current flow being selected to have a magnitude representative of a deceleration rate of X (i.e. 10–50 ft./sec.$^2$) relative to the magnitude of charge on C16 which is, in Mode 1, indicative of the instantaneous magnitude of wheel speed. To this end transistor Q20 is connected to normally shunt out the resistor R43. Q20 is an n-p-n transistor having its emitter connected to ground and its collector connected to the juncture between R42 and R43. The base of Q20 is connected to ground via resistors R46 and R47 and is connected to a conductor 98 via resistor R46 and a diode CR25. The conductor 98 is connected to the Output Amplifier Section 54 (in a manner to be described) and is normally at a positive potential when the module is off and is at a reduced potential (approx. zero) when the module is on whereby Q20 will normally be conductive with the module off and will be rendered non-conductive when the module is on. Thus the bleed rate (X) for the circuit of Q21 and capacitor C16 will be set with transistor Q20 on and R43 shunted; this occurs for Mode 1 and 2 operation. As long as the deceleration rate of the wheel does not exceed X the magnitude of charge on capacitor C16 will be indicative of a percentage of the present wheel speed. When the wheel decelerates at a rate in excess of X then C16 will discharge at a constant rate into the collector-emitter circuit of transistor Q21; such discharge rate is equivalent to the deceleration rate X. This occurs in Mode 2 until the signal of curve B (see FIG. 2) as represented by the magnitude of the charge of C16 (and by the amplified output signal at conductor 96 to Comparator Section 44) exceeds the signal of curve A as represented by the amplified output signal of transistor Q6 (to Comparator Section 44). When the magnitude of signal B exceeds signal A the module will be turned on (via Comparator Section 44 and Output Amplifier Section 54) in a manner to be described. When this occurs Mode 3 operation is initiated.

Considering the sequence of events for Mode 3 or when the module is turned on, the potential at conductor 98 is reduced and Q20 is turned off whereby R43 is no longer shunted out of the base circuit of constant current amplifier Q21. The result is that the bleed rate of the circuit Q21 is increased substantially at a rate for example representative of a deceleration of 130 ft./sec.$^2$. Thus will continue for a preselected time interval, i.e. .150–.200 sec. which is determined by the circuitry of a capacitor C13, to be described; as will be better understood from the description of the other embodiments the representative deceleration could be in the range of from around 100 ft./sec.$^2$ to around 160 ft./sec.$^2$.

Capacitor C13 is across the emitter-collector circuit of p-n-p transistor Q25 in which circuit the emitter is connected to B plus line 74 and one side of C13 and the collector is connected to the other side of C13 via resistor R48. The base of Q25 is connected to B plus line 74 via resistor R49 and to ground via serially connected resistors R50 and R51. The collector of Q25 is connected to ground via resistor R52 which is connected to R48. With Q25 conducting C13 is shunted and will have no effective charge. Q25 is connected to the Output Amplifier Section 54 via a conductor 100; conductor 100 is connected to the juncture of R50 and R51 in the base circuit of Q25 and upon the module turning on will be rendered more positive resulting in Q25 being turned off. At this time C13 will begin to charge through its charge circuit resistor R52. C13 is connected via resistor R69 to the base of p-n-p transistor Q24 which is normally not conductive; the base of Q24 is connected to B plus line 74 via resistor R46'. Q24 will not begin to conduct until C13 attains a preselected magnitude of charge determined by the base circuit resistors R46' and R69 and which will require a set, selected time which corresponds to the desired time duration, i.e. .150–.200 sec., for the high deceleration rate, i.e. 130 ft./sec.$^2$ as part c-e of curve B in Mode 3. Q24 has its emitter connected to B plus line 74, and via resistor R53 and conductor 102 has its collector connected to the juncture of R44 and R45 in the emitter ground circuit of Q21. As Q24 begins to conduct it will apply a gradually increasing potential at resistor R45 to correspondingly vary the discharge rate of C16. Because of the generation into the emitter circuit of Q21 the transistor characteristics of Q24 will result in a continuously varying potential which will produce the generally arcuate transition following the part c-e of curve B. Once transistor Q24 has become fully conductive the potential at R45 will be constant at a level sufficient to prevent further bleed of the Q21 circuit, and the flat, gradually declining portion of curve e-d will result. Depending upon the potential applied to R45 via Q24 and control resistor R53, the end portion of curve e-d can be either very gradually declining or can be approximately flat, i.e. representative of zero to no greater than around 2 ft./sec.$^2$ deceleration and hence a condition of zero discharge rate from capacitor C16. The n-p-n transistor Q12 prevents further application of wheel velocity information through diode CR23 and into C16 while the module is on, i.e. during Mode 3 operation, to insure fidelity of the vehicle control ramp. Thus Q12 has its emitter grounded and its collector connected to diode CR23. The base of Q12 is connected to the Output Amplifier Section 54 via resistor R54' and conductor 104 (which is connected to conductor 100); conductor 104 will normally be at zero potential (module off) and will have a positive potential applied when the module is turned on. With conductor 104 positive, Q12 will be turned on and will place the emitter circuit of Q19 at ground potential. For any plus signal on the base of Q19 the transistor is now biased off. Ground applied to the anode of CR23 will also off bias CR23 to prevent leakage and prevent the magnitude of charge on C16 from increasing or decreasing other than in response to control bleed via Q21. The above describes the generation of curve B for operation in Modes 1, 2 and 3.

As previously noted, once skid control operation has been initiated and the brake pressure relieved (signal B exceeds signal A) the brakes will be reapplied when signal A again exceeds signal B; however, in order to be certain that the system is not permanently left in a brake relief condition or to prevent the system from being in that condition for an inordinate time period, reapplicatin has been provided after the passage of a selected time regardless of whether an indication has been detected of signal A exceeding signal B; thus the present system reapplies the brakes, i.e. turns the module off, after passage of a preselected time as a self check or safety-function. This timing function is performed by the circuit of capacitor C10 which has one end connected to ground and which has a charge circuit including a resistor R55 connected to conductor 100. Thus C10' initiate charging only when conductor 100 has a positive potential applied thereto from Output Amplifier Section 54 when the module is on. A diode CR27 is reverse connected across R55 such that C10' will have a short discharge time since R55 will be shunted out of its discharge circuit which is through R51 to ground. C10' is connected to the emitter of a unijunction transistor Q27 which has one base connected to B plus line 74 via resistor R56. The other base of Q27 is connected to ground via resistor R57 and is connected to the base of switching transistor Q28 via resistor R58. Q28 is an n-p-n transistor having its emitter connected to ground and its collector connected to C16. When the module is turned on C10' will begin to charge; after a selected time (1.8 to 2 sec. in one embodiment) it will attain a charge sufficient to fire Q27. Q27 will generate a trigger pulse which will render Q28 conductive for a sufficient time to discharge C16. This will immediately result in the module being turned off i.e. signal A exceeding signal B and permit the initiation of a new cycle if necessary. This feature prevents the brakes from being maintained off or relieved for an inordinate time period which could result in impaired braking performance.

The switching of the module between its on or off condition is performed by the Comparator Section 44 in response to the amplifier output signal (signal A) from Amplifier Section 47 and the amplified, modified velocity or vehicle control signal (signal B) from the Amplifier and Proportion Section 49.

Comparator Section 44

The Comparator Section 44 (see FIG. 4B) includes a pair of n-p-n transistors Q7 and Q8 connected to compare the output signals from the Amplifier Section 47 (signal A) and Amplifier and Proportion Section 49 (signal B), respectively. Both Q7 and Q8 have their emitters connected to ground via resistor R59. The base of Q7 is coupled to the emitter of Q6 via resistor R36 to receive the amplified output wheel velocity signal (signal A). The collector of Q7 is connected to B plus line 74 via serially connected load resistors R60 and R61. The base of Q8 is coupled to the voltage divider circuit of R39 and R40 via resistor R62 and conductor 96 to receive the velocity or vehicle control signal (signal B). The collector of Q8 is connected to B plus line 74 via load resistor R63. The output from Comparator Section 44 is provided via a p-n-p transistor Q9 which has its emitter connected to B plus line 74 and its collector connected to ground via resistor R64. The base of Q9 is connected to the juncture between resistors R60 and R61. Since normally (Mode 1 operation) the magnitude of signal A exceeds that of signal B, Q7 will normally be on and Q8 off. When Q7 is on Q9 will also be on and an output signal (to hold the module off) will appear at output conductor 106, which is connected from the collector of Q9 to the Output Amplifier Section 54. When, in Mode 3, the control signal B exceeds wheel speed signal A and Q8 will be rendered conductive and Q7 non conductive turning Q9 off and an output signal at conductor 106 will now result in the module being turned on. To prevent hunting a relatively large magnitude resistor R65 is connected to the base of Q8 and to ground via conductors 108 and 100 and resistor R51; the resistor R51 is relatively small compared to R65, e.g. 1K to 1 meg., and will be at ground potential when Q8 is off and at near B+ potential when Q8 is on to provide a hysteresis or latch characteristic and prevent hunting (oscillations during transition). The hysteresis in effect provides for initiation of module turn on at a point subsequent to occurrence of point c. This assures that curve A, for high mu low deceleration conditions, will fall below curve B.

The output signal from Comparator Section 44 at conductor 106 will control the condition of the module via Output Amplifier Section 54.

Output Amplifier Section 54

Still looking to FIG. 4B, the signal at conductor 106 is connected to the base of a p-n-p transistor Q10 which has its emitter connected to B plus line 74 and its collector connected to ground via conductors 108, 100 and resistor R51. A capacitor C18 is connected between base and collector of Q10 and provides a by-pass for transients. Q10 is normally off and hence will be maintained off when Q7 and Q9 are conductive. When Q8 conducts (signal B exceeds signal A) Q7 and Q9 will be off and Q10 will then conduct. Q10 in turn will turn on n-p-n transistor Q11 which, like Q10, is normally non-conductive. Q11 has its emitter connected to ground and has its base connected to ground via a resistor R16 and also connected to the collector of Q10 via blocking diode CR28 and resistor R65. The collector of Q11 is connected to positive unregulated, potential line 72 via resistor R17, diode CR9 and resistor R15. Q11 controls the conduction of a p-n-p transistor Q13, which is also normally non-conductive, and has its base connected to the juncture of diode CR9 and R17. Q13 has its emitter connected to unregulated positive line 72 and has its collector connected to ground via resistor R66 and will be rendered conductive when Q11 conducts. Transistor Q13 controls final output transistor Q14 which also is normally non-conductive. Q14 is an n-p-n transistor having its base connected to the collector of Q13 and having its emitter connected to ground via resistor R18; the collector of Q14 is connected to the unregulated line 72 and an output line 110 is connected to the solenoid 58 from its emitter. When Q13 renders Q14 conductive, the solenoid 58 is actuated to initiate the relief of brake pressure in skid control cycle. When signal A again exceeds signal B the module will be turned off since Q14 will be rendered non-conductive and the solenoid 58 will be deactuated, i.e. no potential at conductor 110.

Note that conductor 108 is connected to the collector of Q10 whereby capacitor C10 can be charged when Q10 is rendered conductive to initiate the timing function previously discussed. At the same time conductor 108 is connected to 100 such that when Q10 conducts (module on) Q25 is rendered non-conductive and C13 can begin to charge up as discussed. Conductor 92 is also connected to the collector of Q10 (from Amplifier Section 47) such that when Q10 is rendered conductive (module on) Q30 will be rendered conductive to terminate the clipping action previously discussed. In a similar manner conductor 98 is connected to the collector of Q11 such that when Q11 is rendered conductive (module on) Q20 will be turned off to modify the bleed rate of transistor Q21 in the manner noted.

Diodes CR11 and CR12 are connected from the emitter of Q14 to ground to provide transient protection.

As noted in the previous discussion it is believed advantageous for some vehicles to provide that the curve B in the end of the e-d portion extend either flat or with some slight incline downwardly, indicating a gradual deceleration; for some vehicle applications including passenger cars or light trucks it is believed that it would be advantageous if the end of the e-d portion extended upwardly; this would result in more spin-up under low mu conditions. Such a curve is shown in FIG. 5. This can be accomplished with only a slight circuit modification as shown in FIG. 6. In FIG. 6, elements similar to like elements in FIGS. 1–4A, B and C have been given the same numerical designation with the addition of the letter postscript a.

Thus in FIG. 6 transistor Q22a has a resistor R68 connected between emitter and base. R68 is selected to be of a magnitude relative to R38a such as to provide charge current for C16a to slowly increase the magnitude of charge in C16a in the e-d region of curve B; thus curve B for the modification of FIGS. 5 and 6 will incline gradually upwardly and hence will affect the time for brake reapplication accordingly; the upward inclination is preferably representative of an acceleration rate of between 10–20 ft./sec.$^2$ and no greater than around 20 ft./sec.$^2$.

As can be readily understood the pneumatic mechanical or hydraulic/mechanical time response of vehicle brake systems is many times slower than typical electronic processing time. The prior systems (associated with curves of FIGS. 2 and 5) will provide adequate anticipation for vehicles such as passenger cars or light trucks. Heavier duty vehicles, however, such as heavy trucks and articulated vehicles are subject to loading which under extreme mu variations lead to significant increases in wheel acceleration and deceleration ranges as compared to passenger cars and light trucks. Consider for example a tractor for hauling a trailer; the wheel load variations can be tremendous from a situation in which the tractor is driven alone and when the tractor is hauling a heavily loaded trailer. This results in extreme wheel acceleration and deceleration ranges which provide an additional anticipation problem requiring additional control parameters. For a heavily loaded vehicle on a high mu surface the maximum wheel deceleration encountered may be moderate (30–50 ft./sec.$^2$) but associated with a very high acceleration rate (on relief of brake pressure 400–650 ft./sec.$^2$). To compensate for system response lags (delays) for reapplication of pressure to prevent the wheel from attaining vehicle velocity, using the previously discussed systems this situation can be compensated by initiating brake reapplication sooner, i.e. extending $c$-$e$ and lowering $e$-$d$. However, considering now a low load, low mu condition operating with the same control parameters, typical decelerations can be 300–500 ft./sec.$^2$ and typical acceleration as low as 33–50 ft./sec.$^2$. There is no longer the need for the same magnitude of anticipation as the previous situation since, at considerably reduced acceleration a significant amount of time will be required for the wheel to return to the flat or $e$-$d$ part of the curve. In this condition the acceleration rate is so low that the system response time or lag for reapplication is less significant and may only account for a 1 to 2 percent gain in wheel speed toward vehicle speed. When magnitudes such as these are encountered if the control flat (portion $e$-$d$) has been lowered to accommodate the first situation noted, the result may be over-anticipation and reapplication of the brake pressure prematurely, preventing the wheel from returning sufficiently close to vehicle velocity (15–20 percent). In order to accommodate this very extreme range of performance requirements it has been found advantageous to establish maximum reapplication anticipation based on high mu, high load requirements and to modify the actual reapplication for other conditions by delaying the initiation of brake reapplication for a time subsequent to the wheel velocity signal passing the flat ($e$-$d$) portion of the control curve.

Note that with both of the previous embodiments the curve B (for Mode 2 and 3 operation) in portions $b$-$c$, $c$-$e$ and $e$-$d$ is generally the same in nature from one cycle to the next except, of course, that the duration of portions $b$-$c$ and $e$-$d$ might vary. It has been found, particularly with articulated vehicles or others which can be subject to extreme variations in load conditions that benefits might be obtained by varying the time when brakes are re-applied as a continuously varying function of spin-up. This is done by providing a variable time delay in the circuit. The result is the curves shown in FIG. 7. In FIG. 7, the curve B is similar to that of FIG. 5 with the $e$-$d$ portion being flat, i.e. neither rising nor declining. The portion $c$-$e$, in FIG. 7, however, has a higher rate, i.e. equivalent of a deceleration of 140 ft./sec.$^2$ for a duration of .150 to .200 sec., such that the flat portion $e$-$d$ of FIG. 7 is substantially lower than that of the previous embodiments. Unlike the previous embodiments however, the module may not be turned off when curve A intersects curve B at point $d$; but, rather, to provide a better response to accommodate variations in mu at point $d$ a variable timing function is initiated which reflects the surface condition during spin-up and ultimately dictates the time when the brakes will be reapplied (module off). To accomplish this, upon initiation of spin-up, another signal curve AA is generated. This curve is generated with an acceleration rate indicative of the lowest, reasonably expected spin-up under the lowest mu conditions. When curve A reaches point $d$ a timing function is initiated with the time delay for turn on (brakes reapplied) being a function of the distance or difference dd between curve A and curve AA; this difference provides an indication of the magnitude of the difference in mu between the preselected, programmed low mu surface and the actual surface whereby an appropriate time delay for a known vehicle and braking system can be provided. For a different mu condition curve A' will result which will intersect curve B at $d'$. In that case the difference in mu will be represented by the difference dd' and an appropriate different time delay will result. Thus unlike the systems of the previous embodiments, the brakes will not necessarily be turned on when signal A exceeds signal B but, rather, at that moment a timing period will be initiated and brakes will be reapplied after expiration of that period. As noted, the timing period will vary with variations in mu and vehicle loading as indicated by the spin-up rate of the wheel and for very high loads and mu's will approach or be zero.

As will be seen the time delays represented by dd and dd' are not fixed but even as the time out function proceeds the final total period will be varied to reflect instantaneous changes in surface mu. The result will be a total time delay varied in effect in accordance with the inverse of the integral of the difference between curve A or A' and AA. If the low mu condition of curve AA is encountered and curve A coincides with the curve AA then the maximum time delay will result. The circuitry to accomplish the above is shown in FIGS. 8B and 8C which are similar to FIGS. 4B and 4C, respectively, and hence circuit components serving similar functions have been given the same numerical designation with the addition of the letter postscript $b$; the circuits of FIGS. 8B and 8C are operational with and are connected with the circuit of FIG. 4A, as indicated.

Looking now to FIG. 8C p-n-P transistor Q24$b$ is connected directly to B plus line 74$b$ and also has its base connected to line 74$b$ via resistor R46$b$. The base is also connected to ground via resistors R69$b$ and R52$b$. Capacitor C13$b$ is connected to line 74$b$ and to the juncture of R69$b$ and R52$b$. As with the circuit of FIG. 4B, Q25$b$ is normally conductive and thereby normally shunts capacitor C13$b$, however, when the module turns on Q25$b$ is rendered non-conductive and C13$b$ can initiate charging. The circuitry of Q24$b$ is such that once C13$b$ reaches a preselected charge it will be rendered fully conductive quickly resulting in a relatively sharp or quick change in bleed rate of Q21$b$ as provided by the output of Q24*b* which is connected to the juncture of resistors R44*b* and R45*b* via conductor 102*b* and resistor R53*b*.

The Comparator Section 44*b* functions the same as Section 44 of FIG. 4B; however, the Output Amplifier Section 54*b* has been modified to include an additional timing circuit 120 to provide the variable time delay noted. Thus transistor Q10*b* is connected to an n-p-n transistor Q40 which has its base connected to the collector of Q10*b* via a resistor R72 and diode CR28*b*; the base is also connected to ground via resistor R73. Q40 has its emitter connected to the base of Q11*b* which is connected to ground via resistor R16*b*. Resistor R74 connects the collector to unregulated positive line 72b via R17*b* and CR9*b*. Thus unlike the circuit of FIG. 4B Q10*b* does not directly control the conduction of Q11*b* but rather Q40 does. When Q40 is on it will turn Q11*b* on and when Q10*b* is on Q40 will be turned on. However, when Q10*b* is rendered non-conductive in accordance with the output signal from the Comparator Section 44*b*, Q40 may still be held conductive by the timing circuit 120. Circuit 120 includes a capacitor C30 which is connected from ground to resistor R72 via a resistor R75. Capacitor C30 will be fully charged by current from Q10*b* via a charge circuit including resistor R75 and when Q10*b* is rendered non-conductive it will begin to discharge into the base cicuit of Q40 holding that transistor on and hence keeping the module on. However, before Q40 will be held on by C30 the charge thereon must have attained a preselected magnitude. The charge circuit is selected to have a preselected time constant such that C30 will not attain this magnitude until a desired time. In one embodiment this time interval was selected as around 0.040 seconds. The full charge for maximum possible time delay for this embodiment was attained at around 0.120 seconds. Thus for the high mu, high load condition in which extreme accelerations in spin-up can occur, no time delay is introduced (since curve A will intersect the *c-e* part of curve B before the bend at *e*); in this case since the rate of the *c-e* portion was increased (over the previous embodiments) curve A will intersect curve B sooner to provide for more on time anticipation. The discharge time circuit of C30, including the circuit of resistors R72, R73, R75 and transistor Q40, provides the maximum discharge time representative of the lowest mu condition noted. The remaining circuitry of circuit 120 modifies this time in a manner to be seen.

A capacitor C31 has one side connected to B plus line 74*b* and its other side connected to R32*b* via a diode CR40; C31 will follow the wheel speed signal as it decreases and will store the charge of lowest speed attained and will begin to discharge as the wheel spins-up, i.e. potential across CR40 will be blocking during spin-up. A discharge circuit for C31 includes a p-n-p transistor Q31 which has its emitter connected to line 74*b* via resistor R76 and has its collector connected to diode CR40 and C31. The base of Q31 is connected to a voltage divider network including a diode CR41 and resistors R77 and R78 connected to the base and to ground, respectively. The voltage divider network determines the discharge rate which is set to correspond to the lowest acceleration rate indicative of the lowest mu condition. The instantaneous charge on C31 provides an analogue of wheel speed spinning up at the noted low rate. This charge is amplified via an n-p-n transistor Q32 which has its base connected to C31 and its collector connected to line 74*b* via resistor R79 and its emitter connected to ground via resistor R80. This signal is then used to bias a p-n-p transistor Q33. The output of Q32 is coupled to a voltage divider network including the serial circuit of a resistor R81, diode CR42, and resistor R82 connected from the emitter of Q32 to ground. The base of Q33 is connected to the juncture of R82 and CR42 via resistor R83. The emitter of Q33 is connected to resistor R32*b* and hence also receives the wheel speed signal and will receive the actual magnitude of wheel velocity during spin-up; transistor Q33 will compare the actual amplitude at its emitter to the analogue at its base and when the actual amplitude exceeds the analogue it will conduct with a current having a magnitude indicative of the magnitude of the difference. This signal is then amplified by an n-p-n transistor Q34 which will be rendered more or less conductive in accordance with the amplitude of the output from Q33. Q34 has its base connected to the collector of Q33 via a resistor R84 and has its emitter connected to ground. The collector of Q34 is connected to the plus side of capacitor C30 via resistor R85. The circuit of R85 and collector emitter circuit Q34 define a parallel discharge path for C30 the impedance of which will be varied in accordance with the amplitude of the difference signal applied to the base of Q34, i.e. representative of the difference between actual wheel speed and analogue during spin-up. Thus for a slow spin-up Q34 will be less conductive than for a fast spin-up and the time delay for reapplying the brakes will be varied accordingly. Note that if the wheel varies in acceleration spin-up this change will be immediately reflected in the conduction of Q33 and in the impedance of Q34 whereby an instantaneous correction will be initiated, i.e. in the magnitude of the remaining time delay, *dd*. With the above structure good turn on characteristics can be attained compensating for the different mu conditions.

In the embodiment of FIGS. 7, 8B and 8C the time delay is determined by the difference dd, between curve A (actual wheel speed) and curve AA (wheel speed analogue based on a programmed minimum acceleration rate). The difference *dd*, reflects an average spin-up rate. In some circumstances it may be desirable to vary the time delay in accordance with actual, instantaneous values of wheel acceleration occurring when and after the wheel speed curve (A) intersects the control curve (B). A modified circuit depicting this type of operation is shown in FIG. 9. FIG. 9 is similar to the circuit of FIGS. 4B and 8B and hence in the description of the modification of FIG. 9 like components have been given the same numerical designation with the addition of the letter postscript *c*, and are connected with the circuit of FIGS. 4A and 8C as indicated.

The modification of FIG. 9 is similar to that of FIGS. 8B and 8C with the main difference being in the use of a modified timing circuit 120*c* in the Output Amplifier Section 54*c*. Thus transistor Q10*c* is connected to an n-p-n transistor Q40*c* which has its base connected to the collector of Q10*c* via resistor R72*c* and diode CR28*c*; the base is also connected to ground via resistor R73*c*. Q40*c* has its emitter connected to the base of Q11*c* which is connected to ground via resistor R16*c*. Resistor 74*c* connects the collector to unregulated positive line 72*c* via R17*c* and CR9*c*. Thus like the circuit of FIG. 4B, Q10*c* does not directly control the conduction of Q11c but rather Q40c does. When Q40c is on it will turn Q11c on and when Q10c is on Q40c will be turned on. However, when Q10c is rendered non-conductive in accordance with the output signal from the Comparator Section, Q40c may still be held conductive by the timing circuit 120c. Circuit 120c includes a capacitor C30c which is connected from ground to resistor R72c via a resistor R75c. Capacitor C30c will be fully charged by current from Q10c and when Q10c is rendered non-conductive it will begin to discharge into the base circuit of Q40c holding that transistor on and hence keeping the module on. The charge circuit, including R75c, *provides the same time delay characteristic to charge C30c* to a magnitude to hold Q40c on as described for capacitor C30 in the prior embodiment. The discharge time circuit of C30c, including the circuit of resistors R72c, R73c, R75c and transistor Q40c, provides the maximum discharge time representative of the lowest mu condition noted. The remaining circuitry of circuit 120c modifies this time in a manner to be seen.

A capacitor C35 has one side connected to output conductor 90c via a resistor R90. Conductor 90c would be connected to the emitter of a transistor, such as Q18b or Q18, from a clamp section, similar to Section 43 or 43b, whereby the potential at conductor 90c will be a potential indicative of wheel speed (such as signal WAa of FIG. 4C). The opposite side of C35 is connected to the base of a p-n-p transistor Q50 which has its emitter connected to B plus line 74c and its collector connected to ground via resistor R91. Another p-n-p transistor Q51 has its base connected to R91 and to the collector of Q50 and has its emitter connected to C35 at the base connection of Q50. An output circuit is connected to the collector of Q51. As long as the wheel is decelerating or generally at a constant velocity current will flow through the base-emitter circuit of Q50 to C35 to maintain Q50 turned on. With Q50 on, substantially B plus potential will appear at R91 to maintain Q51 off. When the wheel spins-up or accelerates the potential at conductor 90c will increase and this will result in current now flowing in the opposite direction to C35 via R90; this will bias Q50 off and remove the high blocking potential from R91 whereby Q51 will now be rendered conductive. Q51 is connected as an amplifier and the reverse current through C35 will flow through the emitter base circuit of Q51 and will be of a magnitude indicative of the magnitude of wheel acceleration. This will be amplified in the emitter-collector circuit of Q51. The collector of Q51 is connected to one side of a parallel circuit 130 including a resistor R92 connected in parallel with a resistor R93 and a diode CR50. CR50 is poled with its anode connected to the collector of Q51. The other side of the parallel circuit 130 is connected to ground via resistor R94. A filter capacitor C36 is connected from R94 to ground to eliminate noise. Resistor R94 and the parallel circuit 130 define a voltage divider network which functions in a manner to be described and to which an n-p-n transistor Q52 is connected via conductor 132 connected to its base. Q52 is connected as an emitter-follower and has its collector connected to the junction of C30c and R75c and has its emitter connected to ground via resistor R95. The magnitude of potential at the base of Q52 will vary the conductivity of the collector-emitter circuit of Q52 to which C30c is connected. The circuit of R95 and collector-emitter circuit of Q52 define a parallel discharge path for C30c the impedance of which will be varied in accordance with the amplitude of the signal from the voltage divider network appearing at the base of Q52. Thus for a slowspin-up Q52 will be less conductive than for a fast spin-up and the time delay for reapplying the brakes will be varied accordingly. It has been found desirable to vary the time delay non-linearly with acceleration such that for very high wheel accelerations the time delay will be disproportionately reduced in comparison to low or medium wheel accelerations. This desired relationship is seen in FIG. 10. Note that from zero volts and zero acceleration up to a wheel acceleration of 80 ft./sec.$^2$ a linear response is provided. From 80 ft./sec.$^2$ upward, however, the response is more exponential and the voltage increases very rapidly. While 80 ft./sec.$^2$ is a preferred magnitude for one embodiment at which the transition between linearity and non-linearity occurs, this transition can occur in a range of around 60 ft./sec.$^2$ to around 100 ft./sec.$^2$. Since the impedance of Q52 will vary with the magnitude of voltage at its base, the discharge rate of C30c will vary accordingly and hence the time delay for reapplication of brakes will vary accordingly.

The response of the curve of FIG. 10 is provided by the voltage divider network. Initially (from 0 to 80 ft./sec.$^2$ voltages) the network will include the effect of R92 and R94 since the diode CR50 will block R93 until the necessary forward voltage is generated across R92 (and hence across R93 and CR50) to render CR50 conductive. When this point is reached and CR50 conducts R93 and the effective impedance of CR50 will shunt R92 to vary the total impedance of parallel circuit 130. Since CR50 provides a constant voltage drop, it will, as the resultant voltage at the collector of Q51 varies, act as a variable resistance decreasing in magnitude as the resultant voltage increases. This provides the desired variable response depicted in FIG. 10 whereby the time delay will be disproportionately less for higher wheel accelerations than for lower wheel accelerations. Note also that in this embodiment the interval of time delayed is varied in accordance with substantially instantaneous magnitudes of wheel acceleration.

In order to insure that C30c will not begin to discharge until the wheel speed curve (curve A) intersects the vehicle control curve (curve B), transistor Q52 is held off until the desired intersection occurs by a hold-off stage including an n-p-n transistor Q53.

Q53 has its emitter grounded and has its collector connected to the base of Q52; the base of Q53 is connected to ground via resistor R96 and is also connected to conductor 108c via resistor R97. Thus the base of Q53 is connected to the collector of transistor Q10c. When the system is actuated to relieve brake pressure Q10c has been rendered conductive via the Comparator Section (such as Section 44b). With Q10c on, Q53 will be rendered conductive which will drop the potential at the base of Q52 keeping Q52 off. In this condition C30c cannot discharge. When the Comparator Section is turned off (as when curve A intersects curve B), Q10b will be turned off resulting in Q53 being turned off. Now Q52 can conduct and the discharge of C30c, previously described, can begin. Once the charge on C30c drops to a level to permit Q40c to turn off the module turns off and brake pressure will be reapplied. To hold the circuit in this condition and to prevent inadvertent turn on again a clamp circuit is provided.

This clamp circuit includes a resistor R98 serially connected to the cathode of a diode CR51; resistor R98 is connected to the base of Q52 and the anode of diode CR51 is connected to the collector of Q11c via conductor 98c. Thus when the module is on and Q11c is on, conductor 98c will be at ground potential reverse biasing CR51 whereby the clamp circuit will be ineffectual. When the module is turned off and Q11c is rendered non-conductive now the potential at conductor 98c increases to forward bias CR51 and apply a positive potential to the base of Q52 to hold Q52 conductive whereby C30c can continue to discharge. In this way inadvertent turn on via charge build up on C30c will be precluded.

The embodiment of FIG. 9 includes a Fail Safe Circuit indicated by the numeral 132. The Fail Safe Circuit 132 has a blocking diode CR52 with its anode connected to conductor 110c which conductor is connected to the emitter of final output transistor Q14c. Thus when the modulating valve is actuated to relieve brake pressure via Q14c being turned on, conductor 110c essentially is at the positive potential of conductor 72c. Diode CR52 has its cathode connected to a timing circuit 134 which includes a resistor R99 connected from the cathode of CR52 to ground, a resistor R100 also connected from the cathode of CR52 and to one side of a capacitor C37; C37 has its opposite side connected to ground. A diode CR53 is connected across R100 with its cathode connected to the cathode of CR52. Thus the charge circuit for C37 includes resistors R99 and R100. In the discharge circuit, however, diode CR53 shunts R100 whereby the discharge time for C37 is substantially less than the charge time. When the output transistor Q14c is on and brakes are relieved, timing is initiated. The charge time for C37 selected such that for normal skid control cycles C37 will be charged to low magnitudes only indicating that the module is functioning properly. If for some reason there is a failure in the module such as to hold Q14b on and hold the brakes relieved; then the charge on C37 will, after a selected interval, attain a preselected magnitude indicative of module failure. This occurrence is sensed and is utilized to deactuate the module permitting normal brake actuation. Thus C37 is connected to the emitter of a unijunction transistor Q54. Q54 has one base connected to positive potential line 72c via a forwardly connected diode CR54 and has its other base connected to ground via a resistor R101; a capacitor C38 connects the one base to ground. A silicon controlled rectifier SCR10 has its cathode connected to ground and its anode connected to the positive potential line 72c; its gate is connected to the other base of Q54 at the resistor R101. Thus when C37 attains a charge having the preselected magnitude indicating failure of the module Q54 will conduct and provide a trigger pulse to the gate circuit of SCR10 rendering SCR10 conductive. Since the Output Amplifier Section 54c is connected to a Power Supply and Voltage Regulator Section (such as Section 41) then the anode-cathode circuit of SCR10 will be connected directly to battery (such as B) and the fuse (such as F) via conductor 72c. When SCR10 is rendered conductive, indicative of module failure, then the battery will be connected directly to ground through the fuse and the fuse will blow opening the circuit from the battery and de-energizing the module. This will deactuate Q14b and the brake modulating valve and permit normal braking.

Failure Warning Circuit 136

A failure warning circuit 136 is shown in FIG. 11; this circuit is operable with any of the embodiments discussed and will be described in conjunction with the first embodiments of FIGS. 1–4C. A failure warning light FL is connected to the ground (system) of battery B. Battery B has its positive side connected to a resistor R102 which is connected to the anode of a diode CR55. The opposite side of the light FL is connected to the cathode of a diode CR56 which has its anode connected to a resistor R103. A resistor R104 has one end connected to the cathode of CR55 and its opposite end connected to ground (module) along with the opposite end of R103. As long as a preselected potential appears across R104 diode CR55 will be blocked and no current will flow to warning light FL. When no or low potential appears across R104 then light FL will be energized to indicate that a failure has occurred; the various failures are described in the following discussion.

A n-p-n transistor Q55 has its emitter connected to R104 and diode CR55 and has its collector connected to positive potential line 72 via a conductor 138. The base of Q55 is connected to positive potential conductor 138 via resistor R105. Normally the positive potential at conductor 138 will render Q55 conductive via the positive potential at the base of Q55 via R105. With Q55 conducting a sufficient potential will appear across R104 to keep light FL unlit. In the event, however, that the fuse F is blown or for some reason the potential drops excessively low then Q55 will be turned off and the blocking potential at R104 (and CR55) will be removed and light FL will be lit indicating a malfunction.

It is desirable to indicate a system malfunction indicated by a loss of wheel speed signal (signal A or WA). To do this a conductor 140 is connected to the baes of Q18 at which wheel speed signal WA appears and is connected to a voltage divider network including serially connected resistors R106 and R107 in which R107 has one end connected to ground. A diode CR57 is connected from the juncture of R106 and R107 to the base of n-p-n transistor Q56. The base is also connected to ground via a resistor R108 and smoothing capacitor C39. Q56 has its emitter connected to ground and has its collector connected to positive conductor 138 via resistor R109. As long as a wheel speed signal (WA) occurs at conductor 140, Q56 will remain conductive and will be rendered non-conductive in the absence of a wheel speed signal. Q56 has its collector connected to the base of an n-p-n transistor Q57, the emitter of which is connected to ground and the collector of which is connected to positive potential line 138 via R109. When Q56 is conducting Q57 will be held off and will not affect Q55. However, if Q56 is turned off, as when no wheel speed signal exists, then Q57 can conduct. With Q57 conducting Q55 will be turned off removing the blocking potential on R104 at CR55, whereby the warning light FL will be lit. Since the module 26 will be energized only when the brakes have been actuated and switch BLS closed, the light FL will not be lit when the vehicle is not moving unless the brakes have been applied; this will serve as a continuity check for the module 26.

It is also desirable to provide a warning when the regulated voltage as appearing on conductor 74 gets too high. Thus a conductor 142 is connected to conductor 74 and to a voltage divider network comprising serially connected resistors R110 and R111 with R111 having one side grounded. An n-p-n transistor Q58 has its base connected to the juncture of R110 and R111 and has its emitter grounded. The collector of Q58 is connected to the base of Q55. Q58 is normally non-conductive; however, in the event the B plus potential at conductor 74 increases to a preselected magnitude indicative of some form of failure in the regulating circuit, then Q58 will be turned on. This will result in Q55 being turned off whereby the warning light FL can be lit.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A skid control system for controlling the brakes to at least one wheel of a wheeled vehicle comprising first means for providing a first signal having a magnitude indicative of the velocity of at least the one wheel, second means for providing a second signal having a magnitude which is a preselected proportion of said first signal until said second signal attains a predetermined time rate of change whereupon said second signal has a magnitude which decreases at a selected time rate of change approximately less than said predetermined rate of change whereby the magnitude of said first signal and said second signal approach each other, comparator means for comparing the magnitudes of said first and second signals and for providing an output signal after said first and second signals have attained a selected relationship, and modulating means responsive to said output signal for initiating release of the brakes.

2. The system of claim 1 with said predetermined time rate of change having a magnitude equivalent of the linear deceleration of at least the one wheel in the range of from approximately 10 ft./sec.$^2$ to around 50 ft./sec.$^2$.

3. The system of claim 2 with said preselected proportion (expressed as a percentage) being in the range of around 94 percent to around 98 percent.

4. The system of claim 1 with said predetermined time rate of change having a magnitude equivalent to the linear deceleration of at least the one wheel of around 30 ft./sec.$^2$.

5. The system of claim 4 with said preselected proportion (expressed as a percentage) being in the range of around 94 percent to around 98 percent.

6. The system of claim 1 with said preselected proportion (expressed as a percentage) being in the range of around 94 percent to around 98 percent.

7. A skid control system for controlling the brakes to at least one wheel of a wheeled vehicle comprising: first control means for providing a first output signal in response to the occurrence of an incipient skid condition of at least the one wheel, second control means for providing a second output signal in response to the recovery of at least the one wheel from the incipient skid condition, said second control means comprising means for generating a control signal subsequent to said first output signal, said control signal having a first portion of rapidly decreasing magnitude and a second generally flat portion, velocity means for providing a velocity signal having a magnitude indicative of the magnitude of the velocity of at least the one wheel, said second control means comprising comparator means for comparing the magnitude of said velocity signal and of said control signal and for providing said second output signal after said velocity signal and said control signal attain a selected relationship, and modulating means responsive to said first output signal for initiating release of the brakes and responsive to said second output signal for initiating reapplication of the brakes.

8. The system of claim 7 with said first portion having a time rate of change of magnitude equivalent with the linear deceleration of at least the one wheel in the range of from around 100 ft./sec.$^2$ to around 160 ft./sec.$^2$.

9. The system of claim 7 with said first portion having a time rate of change of magnitude equivalent with the linear deceleration of at least the one wheel in the range of around 130 ft./sec.$^2$.

10. The system of claim 9 with said first portion having a duration of from around 0.150 seconds to 0.200 seconds.

11. The system of claim 7 with said first portion having a time rate of change of magnitude equivalent with the linear deceleration of at least the one wheel in the range of around 140 ft./sec.$^2$.

12. The system of claim 11 with said first portion having a duration of from around 0.150 seconds to 0.200 seconds.

13. The system of claim 7 with said first portion having a duration of from around 0.150 seconds to 0.200 seconds.

14. The system of claim 7 with said second portion having a generally constant magnitude having a time rate of change of magnitude equivalent with the linear deceleration of at least the one wheel of no greater than around 2 ft./sec.$^2$.

15. The system of claim 7 with said second portion having a time rate of change of magnitude equivalent with the linear acceleration of at least the one wheel of from around 10 ft./sec.$^2$ to no greater than around 20 ft./sec.$^2$.

16. A skid control system for controlling the brakes to at least one wheel of a wheeled vehicle comprising: first control means for providing a first output signal in response to the occurrence of an incipient skid condition at least at the one wheel, second control means for providing a second output signal in response to the recovery of at least the one wheel from the incipient skid condition, said second control means comprising means for generating a control signal subsequent to said first output signal having a first portion of rapidly decreasing magnitude and a second, generally flat portion, said second control means including means operative in response to the magnitude of said control signal for providing said second output signal, and modulating means responsive to said first output signal for initiating release of the brakes and responsive to said second output signal for initiating reapplication of the brakes.

17. The system of claim 16 comprising velocity means for providing a velocity signal having a magnitude indicative of the magnitude of the velocity of at least the one wheel, said means operative in response to the magnitude of said control signal providing said second output signal upon the occurrence of a predetermined relationship between said velocity signal and said control signal.

18. A skid control system for controlling the brakes to at least one wheel of a wheeled vehicle comprising: first control means for providing a first output signal in response to the occurrence of an incipient skid condition at least at the one wheel, second control means for providing a second output signal in response to recovery of at least the one wheel from the incipient skid condition, said second control means comprising means for generating a control signal, said control signal having a first portion of rapidly decreasing magnitude and a second, generally flat portion, said second control means operative in response to said control signal for generating a variable time delay signal operative with said control signal for providing said second output signal, and modulating means responsive to said first output signal for initiating release of brakes and responsive to said second output signal for initiating reapplication of the brakes.

19. The system of claim 18 with said time delay signal providing a time delay of from around zero to a determinable maximum.

20. The system of claim 19 with the magnitude of time delay being varied as a function of the magnitude of acceleration during spin-up of at least the one wheel.

21. The system of claim 20 with the magnitude of time delay being decreased for increasing magnitudes of acceleration.

22. The system of claim 21 with the magnitude of time delay being a function of the cumulative effect of acceleration during spin-up.

23. The system of claim 22 with the cumulative effect being initiated substantially with the initiation of spin-up.

24. The system of claim 22 comprising velocity means for providing a velocity signal having a magnitude indicative of the magnitude of the velocity of at least the one wheel, the cumulative effect being initiated upon attainment of a preselected relationship between said velocity signal and said control signal.

25. The system of claim 22 with the cumulative effect being initiated substantially in time coincidence with said time delay signal.

26. The system of claim 21 with said time delay signal being available only after a preselected time after occurrence of said first control signal.

27. The system of claim 26 with said preselected time delay being greater than around one fourth of the duration of said first portion of said control signal.

28. The system of claim 21 with the magnitude of time delay being decreased non-linearly at a greater rate for increasing magnitudes of acceleration.

29. A skid control system for controlling the brakes to at least one wheel of a wheeled vehicle comprising: first control means for providing a first output signal in response to the occurrence of an incipient skid condition of at least the one wheel, second control means for providing a second output signal in response to the recovery of at least the one wheel from the incipient skid condition, said second control means comprising means for generating a control signal, said control signal being a preprogrammed signal having generally the same shape from one cycle of brake release and reapplication to the next and having a first portion of rapidly decreasing magnitude and a second generally flat portion, velocity means for providing a velocity signal having a magnitude indicative of the magnitude of the velocity of at least one wheel, said second control means comprising comparator means for comparing the magnitude of said velocity signal and of said control signal and for providing said output signal after said velocity signal and said control signal attain a selected relationship, and modulating means responsive to said first output signal for initiating release of the brakes and responsive to said second output signal for initiating reapplication of the brakes.

30. The skid control system of claim 29 with said control signal being initiated generally concurrently with said first output signal.

31. The system of claim 30 with said first portion having a time rate of change of magnitude equivalent with the linear deceleration of at least the one wheel in the range of from around 100 ft./sec.$^2$ to around 160 ft./sec.$^2$.

32. The system of claim 31 with said first portion having a duration of from around 0.150 seconds to 0.200 seconds.

33. The system of claim 32 with said second portion having a generally constant magnitude having a time rate of change of magnitude equivalent with the linear deceleration of at least the one wheel of no greater than around 2 ft./sec.$^2$.

34. The system of claim 32 with said second portion having a time rate of change of magnitude equivalent with the linear acceleration of at least the one wheel of from around 10 ft./sec.$^2$ to no greater than around 20 ft./sec.$^2$.

35. A skid control system for controlling the brakes to at least one wheel of a wheeled vehicle comprising: first control means for providing a first output signal in response to the occurrence of an incipient skid condition at least at the one wheel, second control means for providing a second output signal in response to the recovery of at least the one wheel from the incipient skid condition, said second control means comprising means for generating a preprogrammed control signal having generally the same shape from one cycle of brake release and reapplication to the next and having a first portion of rapidly decreasing magnitude and a second, generally flat portion, said second control means including means operative in response to said control signal for providing said second output signal, and modulating means responsive to said first output signal for initiating release of the brakes and responsive to said second output signal for initiating reapplication of the brakes.

36. The system of claim 35 comprising velocity means for providing a velocity signal having a magnitude indicative of the magnitude of the velocity of at least the one wheel, said means operative in response to said control signal providing said second output signal upon the occurrence of a predetermined relationship between said velocity signal and said control signal for providing said second output signal, said means for generating said control signal initiating said control signal generally concurrently with said first output signal.

37. A skid control system for controlling the brakes to at least one wheel of a wheeled vehicle comprising: first control means for providing a first output signal in response to the occurrence of an incipient skid condition at least at the one wheel, second control means for providing a second output signal in response to recovery of at least the one wheel from the incipient skid condition, said second control means comprising means for generating a control signal, said control signal being a preprogrammed signal having generally the same shape from one cycle of brake release and reapplication to the next and having a first portion of rapidly decreasing magnitude and a second, generally flat portion, said second control means operative in response to said control signal for generating a variable time delay signal operative with said control signal for providing said second output signal, and modulating means responsive to said first output signal for initiating release of brakes and responsive to said second output signal for initiating reapplication of the brakes, said time delay signal providing a time delay from around zero to a determined maximum.

38. The system of claim 37 with said second control means comprising control circuit means for generating said control signal and including energy storage means having a chanage the magnitude of which determines said control signal, bleed circuit means connected to said energy storage means and having a first bleed rate for determining said first portion of said control signal and a second bleed rate for determining said second portion of said control signal.

39. The system of claim 38 with said first bleed rate having a time rate of change of a magnitude equivalent with the linear deceleration of at least the one wheel in the range from around 100 ft./sec.² to around 160 ft./sec.².

40. The system of claim 39 with said second bleed rate having a time rate of change of a magnitude equivalent with the linear deceleration of at least the one wheel of no greater than around 2 ft./sec.².

41. The system of claim 39 with said second bleed rate having a time rate of change of a magnitude equivalent with the linear deceleration of at least the one wheel of from around 10 ft./sec.² to no greater than around 20 ft./sec.².

42. A skid control system for controlling the brakes to at least one wheel of a wheeled vehicle comprising: first control means for providing a first output signal in response to the occurrence of an incipient skid condition at least at the one wheel, second control means for providing a second output signal in response to recovery of at least the one wheel from the incipient skid condition, said second control means comprising control circuit means for generating a control signal, said control signal being a preprogrammed signal having generally the same shape from one cycle of brake release and reapplication to the next and having a first portion of rapidly decreasing magnitude and a second, generally flat portion, said control circuit means including energy storage means having a change the magnitude of which determines said control signal, bleed circuit means connected to said energy storage means and having a first bleed rate having a time rate of change of a magnitude equivalent with the linear deceleration of at least the one wheel in the range from around 100 ft./sec.² to around 160 ft./sec.² for determining said first portion of said control signal and a second bleed rate for determining said second portion of said control signal, and timing circuit means operable for switching said bleed circuit means from said first bleed rate of said second bleed after a period of from around 0.150 seconds to 0.200 seconds, said second control means operative in response to said control signal for generating a variable time delay signal operative with said control signal for providing said second output signal, and modulating means responsive to said first output signal for initiating release of brakes and responsive to said second output signal for initiating reapplication of the brakes, said time delay signal providing a time delay from around zero to a determined maximum.

43. A skid control system for controlling the brakes to at least one wheel of a wheeled vehicle comprising: first means for providing a first signal having a magnitude indicative of the velocity of at least the one wheel, second means for providing a second signal having a magnitude which is a preselected proportion of said first signal until said second signal attains a predetermined time rate of change whereupon said second signal has a magnitude which decreases at a selected time rate of change approximately less than said predetermined rate of change whereby the magnitude of said first signal and said second signal approach each other, comparator means for comparing the magnitudes of said first and second signals and for providing an output signal after said first and second signals have attained a selected relationship, and modulating means responsive to said output signal for initiating release of the brake means for preventing said first signal from falling below a preselected magnitude indicative of a preselected minimum velocity of at least the one wheel.

44. The system of claim 43 with said preselected magnitude being around 5 miles per hour.

45. The skid control system of claim 16 with said first control means comprising first means for providing a first signal having a magnitude indicative of the velocity of the one wheel, second means for providing a second signal having a magnitude which is a preselected proportion of said first signal until said second signal attains a predetermined time rate of change whereupon said second signal has a magnitude which decreases at a selected time rate of change approximately less than said predetermined rate of change whereby the magnitude of said first signal and said second signal approach each other, said first and second control means including comparator means for comparing the magnitudes of said first and second signals and for providing said first output signal after said first and second signals have attained a selected relationship, and for comparing the magnitudes of said first signal and said control signal for providing said second output signal.

46. A skid control system for a vehicle having at least one wheel and a brake for said wheel comprising:
  detecting means for providing a first signal representative of changes in the speed of at least one wheel;
  reference generating means for generating a reference signal representing a first predetermined wheel deceleration in response to an output signal; and
  control means responsive to said first signal for providing said output signal at least in part in response to the exceeding of a second predetermined wheel deceleration which is less than said first predetermined wheel deceleration, said control means further responsive to said first signal and said reference signal for effecting the release of the brakes upon the attainment of a predetermined relationship between said first signal and said reference signal.

47. A skid control system according to claim 46 wherein said means for generating said reference signal generates said reference signal prior to the provision of said output signal and alters said reference signal to represent said first predetermined wheel deceleration in response to said output signal.

48. A skid control system according to claim 7 wherein said control means compares the magnitude of said first signal and the magnitude of said reference signal and provides said output signal when the magnitude of said first signal attains a predetermined relationship with the magnitude of said reference signal.

49. A skid control system according to claim 46 wherein said control means compares the magnitude of said first signal and the magnitude of said reference signal and releases said brakes when the magnitude of said first signal attains a predetermined relationship with the magnitude of said reference signal.

50. A skid control system for a vehicle having at least one wheel and a brake for said wheel comprising:
  detecting means for providing a first signal representative of changes in the speed of at least one wheel;
  reference generating means for generating a reference signal, said reference signal being altered to represent a first predetermined wheel deceleration in response to an output signal, said reference signal representing a second predetermined magnitude of wheel deceleration before said reference signal is altered which is of substantially decreased magnitude relative to said first predetermined magnitude of wheel deceleration; and
  control means responsive to said first signal for providing said output signal at least in part in response to the exceeding of a second predetermined wheel deceleration which is less than said first predetermined wheel deceleration, said control means further responsive to said first signal and said reference signal for effecting the release of the brakes upon the attainment of a predetermined relationship between said first signal and said reference signal.

51. A skid control system according to claim 50 wherein said second predetermined magnitude of wheel deceleration is between 10 and 50 feet per second$^2$ and said first predetermined magnitude of wheel deceleration is between 100 and 160 feet per second$^2$.

52. A skid control system for a vehicle having at least one wheel and a brake for said wheel comprising:
  detecting means for providing a first signal representative of changes in the speed of at least one wheel;
  reference generating means for generating a reference signal including means for altering said reference signal in response to an output signal;
  control means for providing a brake release signal and a brake reapplication signal, said control means including means responsive to said first signal and said reference signal for providing said output signal a predetermined delay after the attainment of a predetermined relationship therebetween, said last means further responsive to said first signal and said altered reference signal for providing said brake reapplication signal upon the attainment of a predetermined relationship between said first signal and said altered reference signal; and
  brake modulating means responsive to said brake release signal for effecting the release of said brakes and responsive to said brake reapplication signal for effecting the reapplication of said brakes.

53. A skid control system according to claim 52 wherein said means for altering said reference signal alters said reference signal to represent a wheel deceleration of decreased magnitude in response to said output signal.

54. A skid control system according to claim 53 wherein said reference signal represents a first predetermined magnitude of wheel deceleration before said reference signal is altered and said altered reference signal represents a second predetermined magnitude of wheel deceleration which is of substantially decreased magnitude relative to said first predetermined magnitude of wheel deceleration.

55. A skid control system according to claim 54 wherein said first predetermined magnitude of wheel deceleration is between 100 and 160 feet per second$^2$.

56. A skid control system according to claim 55 wherein said second predetermined magnitude of wheel deceleration is between 0 and 6 feet per second$^2$.

57. A skid control system according to claim 52 wherein said control means compares the magnitude of said first signal and the magnitude of said reference signal and provides said output signal said predetermined delay after the magnitude of said first signal attains a predetermined relationship with the magnitude of said reference signal.

58. A skid control system according to claim 57 wherein said means for altering said reference current alters said reference signal to represent a wheel deceleration of decreased magnitude in response to said output signal.

59. A skid control system according to claim 52 wherein said predetermined delay is a period of time.

60. A skid control system according to claim 59 wherein said means for altering said reference signal alters said reference signal to represent a wheel deceleration of decreased magnitude in response to said output signal.

61. A skid control system according to claim 60 wherein said reference signal represents a first predetermined magnitude of wheel deceleration before said reference signal is altered to represent a wheel deceleration of increased magnitude, said altered reference signal representing a wheel deceleration of increased magnitude represents a second predetermined magnitude of wheel deceleration which is of substantially greater magnitude than said first predetermined magnitude of wheel deceleration, and said altered reference signal representing a wheel deceleration of decreased magnitude represents a third predetermined magnitude of wheel deceleration which is of substantially decreased magnitude than said first and second predetermined magnitudes of wheel deceleration.

62. A skid control system according to claim 61 wherein said first predetermined magnitude of wheel deceleration is between 10 and 50 feet per second$^2$ and said second predetermined magnitude of wheel deceleration is between 100 and 160 feet per second$^2$.

63. A skid control system according to claim 62 wherein said third predetermined magnitude of wheel deceleration is between 0 and 2 feet per second$^2$.

64. A skid control system for a vehicle having at least one wheel and a brake for said wheel comprising:
  detecting means for providing a first signal representative of changes in the speed of at least one wheel;
  reference generating means for generating a reference signal representing a wheel deceleration of predetermined magnitude including means for altering said reference signal to represent a wheel deceleration of increased magnitude in response to a second signal and for further altering said reference signal to represent a wheel deceleration of decreased magnitude after a predetermined delay after said output signal;

control means responsive to said first signal and said reference signal for providing said second signal upon the attainment of a predetermined relationship therebetween, said control means further responsive to said first signal and said altered reference signal representing a wheel deceleration of increased magnitude for providing a brake release signal upon the attainment of a predetermined relationship between said first signal and said altered reference signal representing a wheel deceleration of increased magnitude, said control means further responsive to said first signal and said altered reference signal representing a wheel deceleration of decreased magnitude for providing a brake reapplication signal upon the attainment of a predetermined relationship between said first signal and said altered reference signal representing a wheel deceleration of decreased magnitude; and brake modulating means responsive to said brake release signal for effecting the release of said brakes and responsive to said brake reapplication signal for effecting the reapplication of said brakes.

65. A skid control system according to claim 64 wherein said control means compares the magnitude of said first signal and the magnitude of said reference signal and provides said output signal when the magnitude of said first signal attains a predetermined relationship with the magnitude of said reference signal.

66. A skid control system according to claim 64 wherein said predetermined delay is a period of time.

* * * * *

UNITED STATES PATENT OFFICE
CERTIFICATE OF CORRECTION

PATENT NO. : 3,912,340
DATED : October 14, 1975
INVENTOR(S) : ROBERT B. BERTOLASI It is certified that error appears in the above-identified patent and that said Letters Patent are hereby corrected as shown below:

Column 1, lines 54 and 55, after "proper", "application"
    should be --anticipation--.
Column 2, line 5, after "braking", insert --is--.
Column 9, line 37, "differential" should be --differentiated--.
Column 10, line 38, "ammlifier" should be --amplifier--.
Column 12, line 13, before "selected", insert --a--.
Column 13, line 24, "Thus" should be --This--.
Column 14, line 37, "reapplicatin" should be --reapplication--.
Column 14, line 46, before "initiate" insert --will--.
Column 15, line 5, "amplifier" should be --amplified--.
Column 16, line 28, "C10" should be --C10'--.
Column 18, line 56, "p-n-P" should be --p-n-p--.
Column 20, line 66, "74c" should be --R74c--.
Column 24, line 38, "baes" should be --base--.
Column 27, line 67, Claim 29, line 16 of claim, after
    "at least", insert --the--.
Column 29, line 17, Claim 38, line 4 of claim, "chanage"
    should be --change--.
Column 31, line 3, Claim 48, line 1 of claim,
    "7" should be --47--.
Column 33, line 5, Claim 64, line 13 of claim, before
    "output" insert --first--.

Signed and Sealed this sixteenth Day of March 1976

[SEAL]

Attest:

RUTH C. MASON
*Attesting Officer*

C. MARSHALL DANN
*Commissioner of Patents and Trademarks*